(12) United States Patent
Lopez et al.

(10) Patent No.: US 9,965,237 B2
(45) Date of Patent: *May 8, 2018

(54) METHODS, SYSTEMS AND PROCESSOR-READABLE MEDIA FOR BIDIRECTIONAL COMMUNICATIONS AND DATA SHARING

(71) Applicants: Kermit D. Lopez, Albuquerque, NM (US); Luis M. Ortiz, Albuquerque, NM (US); Richard H. Krukar, Albuquerque, NM (US)

(72) Inventors: Kermit D. Lopez, Albuquerque, NM (US); Luis M. Ortiz, Albuquerque, NM (US); Richard H. Krukar, Albuquerque, NM (US)

(73) Assignee: Flick Intelligence, LLC, Albuquerque, NM (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/189,315

(22) Filed: Jun. 22, 2016

(65) Prior Publication Data
US 2016/0378420 A1    Dec. 29, 2016

Related U.S. Application Data

(63) Continuation of application No. 14/253,223, filed on Apr. 15, 2014, now Pat. No. 9,459,762, which is a
(Continued)

(51) Int. Cl.
*G06F 3/00* (2006.01)
*G06F 3/0346* (2013.01)
(Continued)

(52) U.S. Cl.
CPC .......... *G06F 3/1431* (2013.01); *G06F 3/0346* (2013.01); *G06F 3/03542* (2013.01);
(Continued)

(58) Field of Classification Search
None
See application file for complete search history.

(56) References Cited

U.S. PATENT DOCUMENTS 5,796,396 A    8/1998    Rich
5,900,869 A *  5/1999    Higashio ............ G06F 3/038
                                                      715/751
(Continued)

FOREIGN PATENT DOCUMENTS

KR    10-2009-0107626 A    10/2009

OTHER PUBLICATIONS

Jun. 21, 2016, Notice of Allowance, U.S. Appl. No. 12/976,148.
(Continued)

*Primary Examiner* — Mahelet Shiberou
(74) *Attorney, Agent, or Firm* — Kermit D. Lopez; Luis M. Ortiz; Richard H. Krukar

(57) ABSTRACT

Methods, systems and processor-readable media for supporting bidirectional communications and data sharing. One or more wireless hand held devices can be registered with one or more controllers associated with one or more multimedia displays. One or more profile icons can be selected for use as a cursor(s) during interaction of the wireless hand held device(s) with one or more multimedia display(s) during rendering of an event as data on the multimedia display(s). Supplemental data can be provided from the multimedia display(s) and/or a remote database to the wireless hand held device(s) based on a selection of the data rendered on the multimedia display(s) marked by the cursor utilizing the wireless hand held device(s).

16 Claims, 18 Drawing Sheets

Related U.S. Application Data continuation of application No. 13/345,382, filed on Jan. 6, 2012, now Pat. No. 8,751,942.

(60) Provisional application No. 61/581,226, filed on Dec. 29, 2011, provisional application No. 61/539,945, filed on Sep. 27, 2011.

(51) Int. Cl.

| | | |
|---|---|---|
| *G06F 3/14* | (2006.01) | |
| *H04N 5/445* | (2011.01) | |
| *H04N 21/422* | (2011.01) | |
| *H04N 21/43* | (2011.01) | |
| *H04N 21/431* | (2011.01) | |
| *H04N 21/45* | (2011.01) | |
| *H04N 21/4728* | (2011.01) | |
| *H04N 21/478* | (2011.01) | |
| *H04N 21/4784* | (2011.01) | |
| *H04N 21/4788* | (2011.01) | |
| *H04N 21/61* | (2011.01) | |
| *H04N 21/81* | (2011.01) | |
| *G06F 3/0354* | (2013.01) | |
| *H04M 1/725* | (2006.01) | |
| *G06F 3/0481* | (2013.01) | |
| *G06F 3/0484* | (2013.01) | |
| *H04W 4/00* | (2018.01) | |
| *H04N 21/4415* | (2011.01) | |
| *G06F 3/033* | (2013.01) | |

(52) U.S. Cl.
CPC ...... *G06F 3/04812* (2013.01); *G06F 3/04817* (2013.01); *G06F 3/04842* (2013.01); *H04M 1/7253* (2013.01); *H04N 5/445* (2013.01); *H04N 5/44591* (2013.01); *H04N 21/4222* (2013.01); *H04N 21/42207* (2013.01); *H04N 21/42209* (2013.01); *H04N 21/42222* (2013.01); *H04N 21/42224* (2013.01); *H04N 21/4307* (2013.01); *H04N 21/4312* (2013.01); *H04N 21/4532* (2013.01); *H04N 21/4728* (2013.01); *H04N 21/4784* (2013.01); *H04N 21/47815* (2013.01); *H04N 21/6125* (2013.01); *H04N 21/8133* (2013.01); *H04W 4/003* (2013.01); *G06F 3/033* (2013.01); *H04N 21/4316* (2013.01); *H04N 21/4415* (2013.01)

(56) References Cited

U.S. PATENT DOCUMENTS

| | | | |
|---|---|---|---|
| 5,909,213 | A | 6/1999 | Martin |
| 6,727,887 | B1 | 4/2004 | Levine et al. |
| 6,834,308 | B1 | 12/2004 | Ikezoye et al. |
| 6,842,190 | B1 | 1/2005 | Lord et al. |
| 6,968,337 | B2 | 11/2005 | Wold |
| 7,197,234 | B1 | 3/2007 | Chatterton |
| 7,242,389 | B1 | 7/2007 | Stern |
| 7,363,278 | B2 | 4/2008 | Schmelzer et al. |
| 7,500,007 | B2 | 3/2009 | Ikezoye et al. |
| 7,529,659 | B2 | 5/2009 | Wold |
| 7,562,012 | B1 | 7/2009 | Wold et al. |
| 7,672,968 | B2 | 3/2010 | Bradateanu et al. |
| 7,714,909 | B2 | 5/2010 | Lord et al. |
| 7,864,159 | B2 | 1/2011 | Sweetser et al. |
| 7,877,438 | B2 | 1/2011 | Schrempp et al. |
| 7,917,645 | B2 | 3/2011 | Ikezoye et al. |
| 7,945,927 | B2 | 5/2011 | Jun et al. |
| 7,969,417 | B2 * | 6/2011 | Yoshida .............. G01C 21/20 345/157 |
| 8,006,314 | B2 | 8/2011 | Wold |
| 8,065,665 | B1 | 11/2011 | Kosche et al. |
| 8,082,150 | B2 | 12/2011 | Wold |
| 8,086,445 | B2 | 12/2011 | Wold et al. |
| 8,086,575 | B2 | 12/2011 | Putterman et al. |
| 8,089,455 | B1 | 1/2012 | Weider |
| 8,370,878 | B2 | 2/2013 | Gharachorloo et al. |
| 8,751,942 | B2 | 6/2014 | Lopez et al. |
| 8,799,401 | B1 | 8/2014 | Bryar et al. |
| 8,897,707 | B2 * | 11/2014 | Faith ............... G06Q 30/0201 345/156 |
| 2002/0002707 | A1 | 1/2002 | Ekel et al. |
| 2002/0049975 | A1 | 4/2002 | Thomas et al. |
| 2002/0056136 | A1 | 5/2002 | Wistendahl et al. |
| 2002/0083469 | A1 | 6/2002 | Jeannin et al. |
| 2002/0167484 | A1 | 11/2002 | Hatanaka et al. |
| 2004/0088739 | A1 | 5/2004 | Shimoji et al. |
| 2004/0153456 | A1 | 8/2004 | Charnock et al. |
| 2004/0205482 | A1 | 10/2004 | Basu et al. |
| 2004/0236825 | A1 * | 11/2004 | Doi .................. H04M 1/7253 709/203 |
| 2005/0010553 | A1 | 1/2005 | Liu |
| 2005/0114325 | A1 | 5/2005 | Liu et al. |
| 2005/0216866 | A1 | 9/2005 | Rosen et al. |
| 2005/0223034 | A1 | 10/2005 | Kaneko et al. |
| 2006/0080130 | A1 | 4/2006 | Choski |
| 2006/0264209 | A1 | 11/2006 | Atkinson et al. |
| 2006/0282776 | A1 | 12/2006 | Farmer et al. |
| 2007/0094618 | A1 * | 4/2007 | Yoshida ............. G06F 3/038 715/856 |
| 2007/0186269 | A1 | 8/2007 | Malik |
| 2007/0288640 | A1 | 12/2007 | Schmeider |
| 2008/0066129 | A1 | 3/2008 | Katcher et al. |
| 2008/0208589 | A1 | 8/2008 | Cross et al. |
| 2009/0007023 | A1 | 1/2009 | Sundstrom |
| 2009/0092374 | A1 | 4/2009 | Kulas |
| 2009/0103887 | A1 | 4/2009 | Choi et al. |
| 2009/0138906 | A1 | 5/2009 | Eide et al. |
| 2009/0147990 | A1 | 6/2009 | Lev |
| 2009/0228492 | A1 | 9/2009 | Valdez et al. |
| 2009/0319884 | A1 | 12/2009 | Amento et al. |
| 2009/0319885 | A1 | 12/2009 | Amento et al. |
| 2009/0327894 | A1 | 12/2009 | Rakib et al. |
| 2010/0050082 | A1 | 2/2010 | Katz et al. |
| 2010/0138517 | A1 | 6/2010 | De Los Reyes et al. |
| 2010/0154007 | A1 * | 6/2010 | Touboul ............ G06Q 30/02 725/60 |
| 2010/0226626 | A1 | 9/2010 | Lord et al. |
| 2010/0235379 | A1 | 9/2010 | Reichbach |
| 2010/0235865 | A1 | 9/2010 | Jordan et al. |
| 2010/0293190 | A1 | 11/2010 | Kaiser et al. |
| 2010/0325572 | A1 * | 12/2010 | Morris ............... G06F 3/03541 715/773 |
| 2011/0137753 | A1 | 6/2011 | Moehrle |
| 2011/0138317 | A1 * | 6/2011 | Kang ................. G06F 3/011 715/780 |
| 2011/0167447 | A1 | 7/2011 | Wong |
| 2011/0173141 | A1 | 7/2011 | Campbell et al. |
| 2012/0062468 | A1 | 3/2012 | Chen et al. |
| 2012/0069131 | A1 | 3/2012 | Abelow |
| 2012/0139839 | A1 | 6/2012 | Krukar et al. |
| 2014/0344719 | A1 | 11/2014 | Lopez et al. |
| 2016/0182971 | A1 | 6/2016 | Ortiz et al. |

OTHER PUBLICATIONS

U.S. Appl. No. 12/976,148, filed Dec. 22, 2010, Krukar et al.
U.S. Appl. No. 13/345,382, filed Jan. 6, 2012, Lopez et al.
U.S. Appl. No. 13/345,404, filed Jan. 6, 2012, Krukar et al.
U.S. Appl. No. 13/371,602, filed Feb. 13, 2012, Krukar et al.
Oct. 5, 2012, Office Action, U.S. Appl. No. 12/976,148.
Jan. 31, 2013, Final Office Action, U.S. Appl. No. 12/976,148.
Sep. 19, 2013, Appeal Brief, U.S. Appl. No. 12/976,148.
U.S. Appl. No. 13/413,859, filed Mar. 7, 2012, Ortiz et al.
U.S. Appl. No. 14/253,223, filed Apr. 15, 2014, Lopez et al.
U.S. Appl. No. 14/976,493, filed Dec. 21, 2015, Ortiz et al.
Jan. 3, 2014, Examiner's Answer to Appeal Brief, U.S. Appl. No. 12/976,148.

(56) References Cited

OTHER PUBLICATIONS

Mar. 3, 2014, Reply Brief Filed, U.S. Appl. No. 12/976,148.
Mar. 15, 2016, Patent Board Decision—Examiner Reversed, U.S. Appl. No. 12/976,148.
Oct. 16, 2012, Pre-interview First Action, U.S. Appl. No. 13/345,382.
Nov. 16, 2012, Amendment/Reply, U.S. Appl. No. 13/345,382.
Dec. 7, 2012, First Action Interview—Office Action, U.S. Appl. No. 13/345,382.
Jan. 7, 2013, Amendment/Reply, U.S. Appl. No. 13/345,382.
Mar. 25, 2013, Final Rejection, U.S. Appl. No. 13/345,382.
May 28, 2013, Amendment/Reply, U.S. Appl. No. 13/345,382.
Dec. 24, 2013, Appeal Brief Filed, U.S. Appl. No. 13/345,382.
Mar. 13, 2014, Notice of Allowance, U.S. Appl. No. 13/345,382.
Apr. 15, 2014, Amendment/Reply, U.S. Appl. No. 13/345,382.
May 8, 2014, Amendment/Reply, U.S. Appl. No. 13/345,382.
Feb. 18, 2016, Non-Final Rejection, U.S. Appl. No. 14/253,223.
Apr. 27, 2016, Amendment/Response, U.S. Appl. No. 14/253,223.
May 13, 2016, Notice of Allowance, U.S. Appl. No. 14/253,223.
May 26, 2016, Miscellaneous Communication to Applicant, U.S. Appl. No. 14/253,223.
Sep. 27, 2013, Pre-Interview First Action, U.S. Appl. No. 13/345,404.
Nov. 27, 2013, Amendment/Remarks, U.S. Appl. No. 13/345,404.
Mar. 10, 2014, First Action Interview Office Action, U.S. Appl. No. 13/345,404.
Jun. 10, 2014, Reply, U.S. Appl. No. 13/345,404.
Oct. 9, 2014, Final Rejection, U.S. Appl. No. 13/345,404.
Dec. 5, 2012, Non-Final Rejection, U.S. Appl. No. 13/371,602.
Apr. 4, 2013, Amendment/Response, U.S. Appl. No. 13/371,602.
Aug. 13, 2013, Final Rejection, U.S. Appl. No. 13/371,602.
Dec. 13, 2013, Amendment/Response, U.S. Appl. No. 13/371,602.
Mar. 12, 2014, Supplemental Amendment/Response, U.S. Appl. No. 13/371,602.
Mar. 14, 2014, Non-Final Rejection, U.S. Appl. No. 13/371,602.
Aug. 14, 2014, Amendment/Response, U.S. Appl. No. 13/371,602.
Dec. 3, 2014, Final Rejection, U.S. Appl. No. 13/371,602.
Apr. 3, 2015, Notice of Appeal & Pre-Brief Conference Request, U.S. Appl. No. 13/371,602.
Jun. 2, 2015, Pre-Brief Appeal Conference Decision, U.S. Appl. No. 13/371,602.
Jul. 2, 2015, Appeal Brief Filed, U.S. Appl. No. 13/371,602.
Sep. 25, 2015, Appeal Brief Filed, U.S. Appl. No. 13/371,602.
Mar. 9, 2016, Examiner's Answer to Appeal Brief, U.S. Appl. No. 13/371,602.
May 9, 2016, Reply Brief Filed, U.S. Appl. No. 13/371,602.
Aug. 14, 2013, Pre-interview first office action, U.S. Appl. No. 13/413,859.
Dec. 3, 2013, Amendment/Response, U.S. Appl. No. 13/413,859.
Mar. 11, 2014, First Action Interview—Office Action, U.S. Appl. No. 13/413,859.
Jun. 11, 2014, Amendment/Response, U.S. Appl. No. 13/413,859.
Nov. 5, 2014, Final Rejection, U.S. Appl. No. 13/413,859.
Mar. 5, 2015, Amendment/Response, U.S. Appl. No. 13/413,859.
Aug. 17, 2015, Non-Final Rejection, U.S. Appl. No. 13/413,859.
Dec. 17, 2015, Amendment/Response, U.S. Appl. No. 13/413,859.
Apr. 20, 2016, Final Rejection, U.S. Appl. No. 13/413,859.
Jun. 17, 2016, Response after Final Action, U.S. Appl. No. 13/413,859.
Apr. 26, 2017 Decision on Appeal, U.S. Appl. No. 13/371,602.
May 4, 2017, Final Rejection, U.S. Appl. No. 14/976,493.

\* cited by examiner

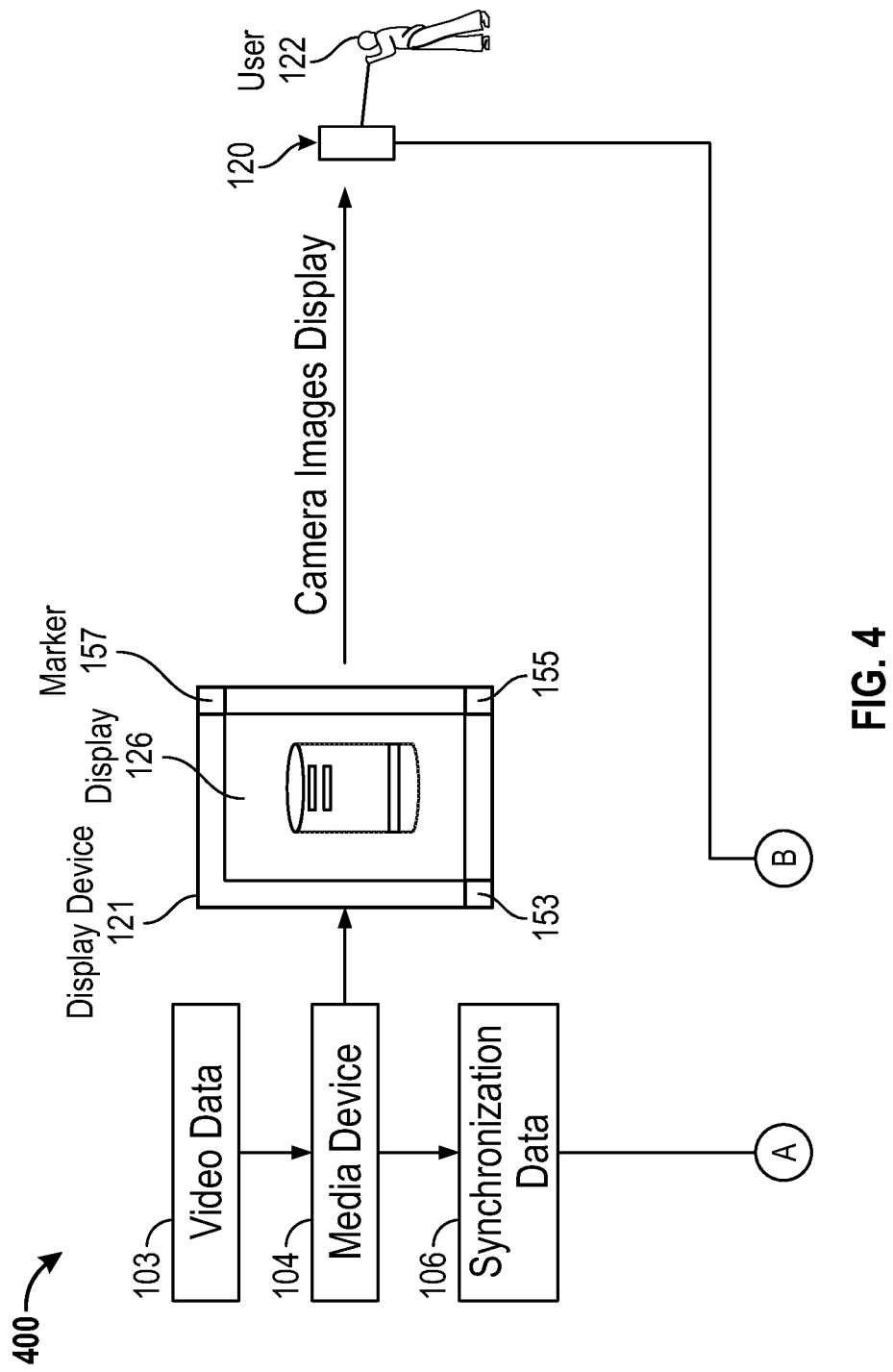

METHODS, SYSTEMS AND PROCESSOR-READABLE MEDIA FOR BIDIRECTIONAL COMMUNICATIONS AND DATA SHARING

CROSS-REFERENCE AND PRIORITY TO PATENT APPLICATIONS

This patent application is a continuation of U.S. patent application Ser. No. 14/253,223, which was filed on Apr. 15, 2014, and is incorporated herein by reference in its entirety. U.S. patent application Ser. No. 14/253,223 is in turn a continuation of U.S. patent application Ser. No. 13/345,382 entitled "Method, System and Processor-Readable Media for Bidirectional Communications and Data Sharing Between Wireless Hand Held Devices and Multimedia Display Systems," which was filed on Jan. 6, 2012 and is incorporated herein by reference in its entirety. U.S. patent application Ser. No. 13/345,382 claims the benefit under 35 U.S.C. § 119(e) of U.S. Provisional Application Ser. No. 61/581,226 entitled, "Method, System and Processor-Readable Media for Bidirectional Communications and Data Sharing Between Wireless Hand Held Devices and Multimedia Display Systems," which was filed on Dec. 29, 2011 and is incorporated herein by reference in its entirety. U.S. patent application Ser. No. 13/345,382 also claims the benefit under 35 U.S.C. § 119(e) of U.S. Provisional Application Ser. No. 61/539,945 entitled, "FlickIntel System Elements, Modules, Properties and Capabilities," which was filed on Sep. 27, 2011 and is incorporated herein by reference in its entirety. This patent application therefore also claims priority to the aforementioned filing dates of these provisional patent applications.

TECHNICAL FIELD

Embodiments relate to video content, video displays, and video compositing. Embodiments also relate to computer systems, user input devices, databases, and computer networks. Embodiments also relate to multimedia gaming and entertainment environments in which more than one user can participate wirelessly in an electronic game or jointly access and view entertainment via multimedia devices. Embodiments are also related to methods, systems and processor-readable media for supporting bidirectional communications and data sharing.

BACKGROUND

People have watched video content on televisions and other audio-visual devices for decades. They have also used gaming systems, personal computers, handheld devices, and other devices to enjoy interactive content. They often have questions about places, people, and things' appearing as the video content is displayed, and about the music they hear. Databases containing information about the content such as the actors in a scene or the music being played already exist and provide users with the ability to learn more.

The existing database solutions provide information about elements appearing in a movie or scene, but only in a very general way. A person curious about a scene element can obtain information about the scene and hope that the information mentions the scene element in which the person is interested. Systems and methods that provide people with the ability to select a specific scene element and to obtain information about only that element are needed.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole It is, therefore, one aspect of the disclosed embodiments to provide for methods, systems and processor-readable media for supporting bidirectional communications and data sharing.

It is another aspect of the disclosed embodiments to provide for methods, systems and processor-readable media enabling the display of supplemental data to wireless hand held devices and/or multimedia displays with respect to content/media of interest.

The aforementioned aspects and other objectives and advantages can now be achieved as described herein. Methods, systems and processor-readable media are disclosed for supporting bidirectional communications and data sharing. A method can include, for example, registering at least one wireless hand held device with a controller associated with at least one multimedia display; selecting at least one profile icon for use as a cursor during interaction of the at least one wireless hand held device with the at least one multimedia display during rendering of an event as data on the at least one multimedia display; and providing supplemental data from at least one of the at least one multimedia display and/or a remote database to the at least one wireless hand held device based on a selection of the data rendered on the at least one multimedia display marked by the cursor utilizing the at least one wireless hand held device.

In other embodiments, a step can be implemented for providing the event as at least one of a movie, television program, recorded event, a live event, or a multimedia game. In yet other embodiments, a step can be implemented for manipulating via the controller, the data rendered on the at least one multimedia display utilizing the at least one wireless hand held device. In still other embodiments, a step can be implemented for storing the supplemental data in a memory in response to a user input via the at least one wireless hand held device. In other embodiments, a step can be implemented for pushing the supplemental data for rendering via at least one other multimedia display. In yet other embodiments, a step can be implemented for pushing the supplemental data via at least one of the at least one wireless hand held device, a remote server, or the controller associated with the at least one multimedia display. In still other embodiments, a step can be provided for filtering the supplemental data for rendering via a multimedia display.

In another embodiment, a system can be implemented for supporting bidirectional communications and data sharing. Such a system can include a processor and a data bus coupled to the processor. In addition, such a system can include a computer-usable medium embodying computer code, the computer-usable medium being coupled to the data bus, the computer program code comprising instructions executable by the processor and configured for: registering at least one wireless hand held device with a controller associated with at least one multimedia display; selecting at least one profile icon for use as a cursor during interaction of the at least one wireless hand held device with the at least one multimedia display during rendering of an event as data on the at least one multimedia display; and providing supplemental data from at least one of the at least one multimedia display and/or a remote database to the at least one wireless hand held device based on a selection of the data rendered on the at least one multimedia display marked by the cursor utilizing the at least one wireless hand held device.

In another embodiment, such instructions can be further configured for providing the event as at least one of a movie, television program, recorded event, a live event, or a multimedia game. In yet another embodiment, such instructions can be further configured for manipulating via the controller, the data rendered on the at least one multimedia display utilizing the at least one wireless hand held device. In still other embodiments, such instructions can be further configured for storing the supplemental data in a memory in response to a user input via the at least one wireless hand held device. In yet another embodiment, sum instructions can be configured for pushing the supplemental data for rendering via at least one other multimedia display. In other embodiments, such Instructions can be further configured for pushing the supplemental data via at least one of the at least one wireless hand held device, a remote server, or the controller associated with the at least one multimedia display. In other embodiments, such instructions can be further configured for filtering the supplemental data for rendering via a multimedia display.

In another embodiment a processor-readable medium can be implemented for storing code representing instructions to cause a processor to perform a process to support bidirectional communications and data sharing. Such code can in some embodiments comprise code to register at least one wireless hand held device with a controller associated with at least one multimedia display; select at least one profile icon for use as a cursor during interaction of the at least one wireless hand held device with the at least one multimedia display during rendering of an event as data on the at least one multimedia display; and provide supplemental data from at least one of the at least one multimedia display and/or a remote database to the at least one wireless hand held device based on a selection of the data rendered on the at least one multimedia display marked by the cursor utilizing the at least one wireless hand held device.

In other embodiments, such code can further comprise code to provide the event as at least one of a movie, television program, recorded event, a live event, or a multimedia game. In still other embodiments, such code can comprise code to manipulate via the controller, the data rendered on the at least one multimedia display utilizing the at least one wireless hand held device. In yet other embodiments, such code can comprise code to store the supplemental data in a memory in response to a user input via the at least one wireless hand held device. In yet another embodiment, such code can comprise code to push the supplemental data for rendering via at least one other multimedia display. In still other embodiments, such code can comprise code to push the supplemental data via at least one of the at least one wireless hand held device, a remote server, or the controller associated with the at least one multimedia display. In other embodiments, such code can comprise code to filter the supplemental data for rendering via a multimedia display.

BRIEF DESCRIPTION OF THE FIGURES

The accompanying figures, in which like reference numerals refer to identical or functionally-similar elements throughout the separate views and which are incorporated in and form a part of the specification, further illustrate the present invention and together with the detailed description herein, serve to explain the principles of the disclosed embodiments.

DETAILED DESCRIPTION

Figure 1:
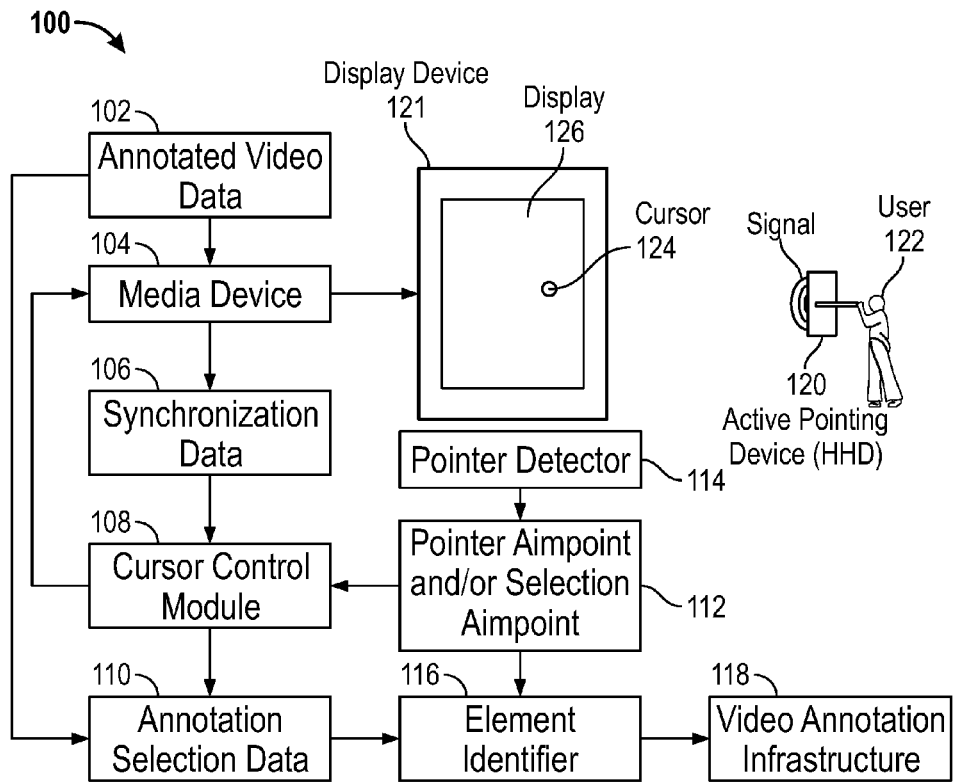
FIG. 1 illustrates a high level diagram of portions of a system including a wireless Hand Held Device (HHD), which may be implemented as an active pointer, in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the disclosed embodiments. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which disclosed embodiments belong. It will be further understood that terms such as those defined in commonly used dictionaries should be interpreted as having a meaning that is consistent with their meaning in the context of the relevant art and will not be interpreted in an idealized or overly formal sense unless expressly so defined herein.

As will be appreciated by one skilled in the art, the present invention can be embodied as a method, system, and/or a processor-readable medium. Accordingly, the embodiments may take the form of an entire hardware application, an entire software embodiment or an embodiment combining software and hardware aspects all generally referred to herein as a "circuit" or "module." Furthermore, the embodiments may take the form of a computer program product on a computer-usable storage medium having computer-usable program code embodied in the medium. Any suitable computer-readable medium or processor-readable medium may be utilized including, for example, but not limited to, hard disks, USB Flash Drives, DVDs, CD-ROMs, optical storage devices, magnetic storage devices, etc.

Computer program code for carrying out operations of the disclosed embodiments may be written in an object oriented programming language (e.g., Java, C++, etc.). The computer program code, however, for carrying out operations of the disclosed embodiments may also be written in conventional procedural programming languages, such as the "C" programming language, HTML, XML, etc., or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The disclosed embodiments are described in part below with reference to flowchart illustrations and/or block diagrams of methods, systems, computer program products, and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process, such that the instructions which execute on the computer or other programmable apparatus provide steps for implementing the functions/acts specified in the block or blocks.

Note that the instructions described herein such as, for example, the operations/instructions and steps discussed herein, and any other processes described herein can be implemented in the context of hardware and/or software. In the context of software, such operations/instructions of the methods described herein can be implemented as, for example, computer-executable instructions, such as program modules being executed by a single computer or a group of computers or other processors and processing devices. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as for example, hand-held devices, multi-processor systems, data networks, microprocessor-based or programmable consumer electronics, networked PCs, minicomputers, tablet computers (e.g., iPad and other "Pad" computing device), remote control devices, wireless hand held devices, Smartphones, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc. Additionally, the term "module" can also refer in some instances to a hardware component such as a computer chip or other hardware.

It will be understood that the circuits and other means supported by each block and combinations of blocks can be implemented by special purpose hardware, software or firmware operating on special or general-purpose data processors, or combinations thereof. It should also be noted that, in some alternative implementations, the operations noted in the blocks may occur out of the order noted in the figures. For example, two blocks shown in succession may in fact be executed substantially concurrently, or the blocks may sometimes be executed in the reverse order, or the varying embodiments described herein can be combined with one another or portions of such embodiments can be combined with portions of other embodiments in another embodiment.

FIG. 1 illustrates a high level diagram of portions of a system 100 including a wireless Hand Held Device (HHD) 120, which may be implemented as an active pointer, in accordance with the disclosed embodiments. Note that the HHD 120 may be, for example, a wireless hand held device, such as, for example, a Smartphone, cellular telephone, a remote control device such as a video game control device, a television/set-top box remote control, a table computing device (e.g., "iPad") and so forth. An active pointer is one that emits a signal. A remote control emitting an ultraviolet signal, a flashlight, or a laser pointer are examples of an active pointer. Thus an active pointing application can be incorporated into a HHD such as HHD 120 and can also communicate via wireless bidirectional communications with other devices, such as, for example the multimedia display 121 shown in FIG. 1. Such a multimedia display can be, for example, a television or monitor or other display screen (e.g., a movie theater display screen), which in turn can be, in some scenarios, associated with a controller or set-top box, etc. As shown in FIG. 1 a user 122 can hold the HHD 120, which in turn can emit and receive wireless signals. The multimedia display device 121 (i.e., display device) generally includes a multimedia display area or multimedia display 126.

Information can be embedded in the emitted signal, such as identification information that identifies the pointer or HHD 120 or that identifies the user 122. The user 122 can be recognized by the HHD 120 or pointer in a variety of ways, such as by requiring a passcode tapped out on one or more buttons, a unique gesture detected by accelerometers, or biometric data such as a fingerprint, retinal pattern, or one of the body's naturally occurring and easily measurable signals such as heartbeat that has been shown to often contain unique traits. One of the datum's often encoded in the emitted signal is the state of a selection button. One very simple case would involve the use of a laser pointer as the HHD 120 that is simply on or off. An advantage of embedding a unique identifier in the emitted signal is that multiple pointers can be used simultaneously.

A pointer detector 114 can read and track the emitted signal. The pointer detector 114 typically has multiple sensors and can determine where the pointer or HHD 120 is pointing. In many cases, the pointer detector 114 and the display 126 being presented on a multimedia display such as multimedia display 126 are separate units that can be located near one another. A calibration routine can be utilized so that the pointer detector 114 can accurately determine where on the display 126 the pointer is aimed. The output of the pointer detector 114 can include the pointer's aim point and the state of the selection button or other selection actuator.

The multimedia display device 121 and hence the multimedia display 126 present video data such as a movie, television show, or sporting event to the user 122. The video data can be annotated by associating it with annotation selection data. The annotation selection data 110 specifies the times and screen locations at which certain scene elements, each having an element identifier 116, are displayed. The annotation selection data 110 can be included with the video data as a data channel similar to the red, green, blue channels present in some video formats, can be encoded into blank spaces in an NTSC type signal, can be separately transmitted as a premium service, can be downloaded and stored, or another technique by which the user has access to both the video data and the annotation data can be used.

An important aspect is that the annotation data and the video data be time synchronized because selectable scene elements can move around on the display. Thus, synchronization data 106 can be utilized to ensure that the video data and annotation selection data 110 are in sync. One example of synchronization data is the elapsed time from the video start until the current frame is displayed.

The annotation data can specify selectable zones. A simple image can have selectable areas. A video, however, is a timed sequence of images. As such, a selectable zone is a combination of selectable areas and the time periods during which the areas are selectable. A selectable zone has coordinates in both space and time and can be specified as a series of discrete coordinates, a series of temporal extents (time periods) and areal extents (bounding polygons or closed curves), as areal extents that change as a function of time, etc. Areal extents can change as a function of time when a selectable area moves on the display, changes size during a scene, or changes shape during a scene.

For brevity, the terms "selectable zone" and "cursor coordinate" will be used in this disclosure as having both spatial and temporal coordinates. As discussed above, a selectable zone can be specified in terms of on-screen extents and time periods. Similarly, a cursor coordinate combines the aim point and a media time stamp. Annotated scene elements can be specified as selectable zones associated with one or more element identifiers, such as, for example, element identifier 116.

As also shown in FIG. 1, a cursor control module 108 can change the appearance of a displayed cursor 124 based on the cursor coordinate. The aim point can be passed to the cursor control module 108 that also receives synchronization data. The synchronization data can indicate the displayed scene, elapsed time within a scene, elapsed time from video start, the media time stamp, or other data that helps determine the media time stamp. The cursor coordinate can be determined from the aim point and the media time stamp. The cursor control module 108 can examine the annotation selection data for the cursor coordinate to determine if the pointer is aimed at an annotated scene element. In terms of selectable zones, the cursor coordinate lies within a selectable zone or it doesn't. If it does, the cursor control module 108 can cause a "selectable" cursor to be displayed at the aim point. Otherwise, a different cursor can be displayed.

The cursor control module 108 can communicate with a media device 104, which in turn can communicate with the display device 121. The media device 104 also receives data from the annotated vide data 102 and then sends data as, for example, synchronization data 106 to the cursor control module 108. The pointer detector 114 can transmit, for example, pointer aim point and/or selection aim point information 112 to the cursor control module 108. Additionally annotation selection data 110 can be provided to the cursor control module 108 and also to one or more element identifiers, such as, for example, the element identifier 116, which in turn can send information/data to a video annotation infrastructure.

Figure 2:
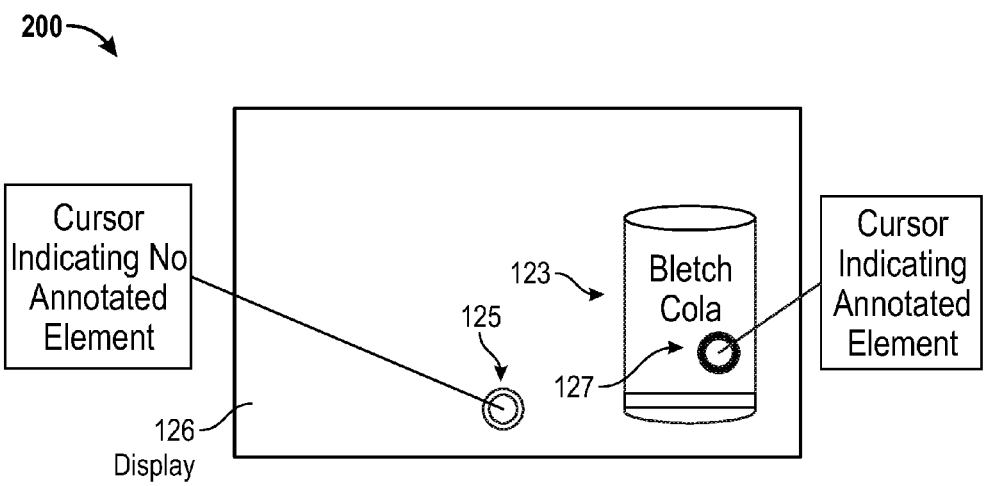
FIG. 2 illustrates two cursors being displayed over selectable and non-selectable screen areas, in accordance with the disclosed embodiments.

FIG. 2 illustrates two cursors 125 and 127 being displayed over selectable and non-selectable screen areas, in accordance with the disclosed embodiments. The screen area occupied by the "Bletch Cola" image 123 is within a selectable zone and a solid ring cursor 127 is shown. Other areas are not inside selectable zones and an empty ring (i.e., cursor 125) is shown. Any easily distinguished set of cursors can be utilized because the reason for changing the cursor is to alert a user, such as user 122 that the screen element is selectable.

Returning to FIG. 1, aiming at a selectable scene element can result in a "selectable" cursor being displayed. The selectable element can be selected by actuating a trigger or button on the pointing device. Other possibilities include letting the cursor linger over the selectable element, awaiting a "select this" query to pop up and pointing at that, or performing a gesture with the pointing device/HHD 120.

The annotation data can include additional data associated with the selectable areas or selectable zones such as element identifiers, cursor identifiers, cursor bitmaps, and zone executable code. The zone executable code can be triggered when the cursor enters a selectable zone, leaves a selectable zone, lingers in a selectable zone, or when a selection type event occurs when the cursor coordinate is inside a selectable zone. The zone executable code can augment or replace default code that would otherwise be executed when the aforementioned events occur. For example, the default code for a selection event can cause an element identifier to be embedded in an element query that is then sent to a portion of the video annotation infrastructure. The zone executable code can augment the default code by sending tracking information to a market research firm, playing an audible sound, or some other action. In general, the additional data allows for customization based on the specific selectable zone.

Figure 3:
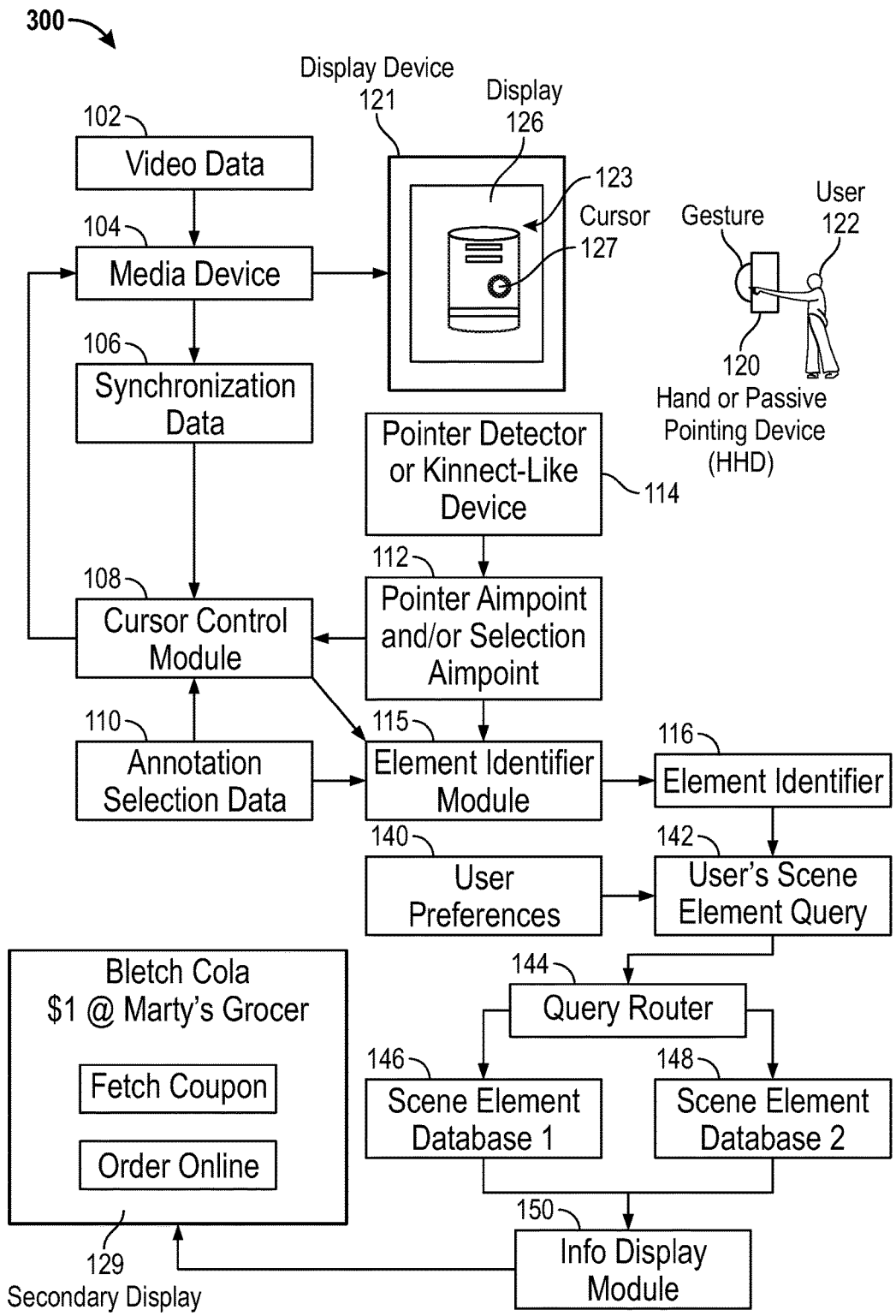
FIG. 3 illustrates a system that includes at least one HHD and at least one multimedia display, in accordance with the disclosed embodiments.

FIG. 3 illustrates a system 300 that includes a HHD 120 and a multimedia display 126, in accordance with the disclosed embodiments. System 300 of FIG. 3 is similar to system 100 of FIG. 1 with some notable exceptions. System 100 of FIG. 1 includes "annotated video data" (i.e., annotated video data 102) wherein the annotation selection data 110 is distributed with the video data. In system 300 of FIG. 3, the annotation selection data 110 is obtained from some other source. As in FIG. 1, however, the media device 104 still provides the synchronization data 106 used for determining the time datum for the cursor coordinate. Another difference is that a passive pointing device such as a hand can be utilized. A device such as, for example, the Microsoft Kinnect® can determine an aim point, selection gesture, and other actions by analyzing the user's stance, posture, body position, or movements. Of course, HHD 120 may be, as indicated earlier, a Smartphone, game control device, tablet or pad computing device, and so forth. It can be appreciated, for example, the HHD 120 and the pointer detector 113 may be, for example, the same device, or associated with one another.

FIG. 3 illustrates an element identification module 115 examining the cursor coordinate and annotation data to determine an element identifier 116. The element identifier and some user preferences 140 can be combined to form a scene element query 142. The user preferences can include the user's privacy requests, location data, data from a previous query, or other information. Note that the law can govern the privacy request. For example, the US has statutes governing children's privacy and many nations have statutes governing the use and retention of anyone's private data.

The user's element query can pass to a query router 144. The query router 144 can send the query to a number of servers based on the element identifier 116 (e.g., element ID), the user's preferences, etc. Examples include: local servers that provide information tailored to the user's locale; product servers that provide information directly from manufacturers, distributors, or marketers, ad servers wherein specific queries are routed to certain servers in return for remuneration, and social network servers that share the query or indicated interest amongst the user's friends or a select subset of those friends. The query router 144 can route data to, for example, one or more scene element databases 148, which in turn provides information to an information display module 150. The information display module 150 can assemble the query responses and displays them to a user, such as user 122.

Note that FIG. 3 also illustrates a secondary multimedia display 129 on which query results can be presented. One response is an advertisement, another is an offer for a coupon, and a third is an offer for online purchase. The secondary display 129 can be, for example, a cell phone, computer, tablet, television, or other web-connected device.

Figure 4:
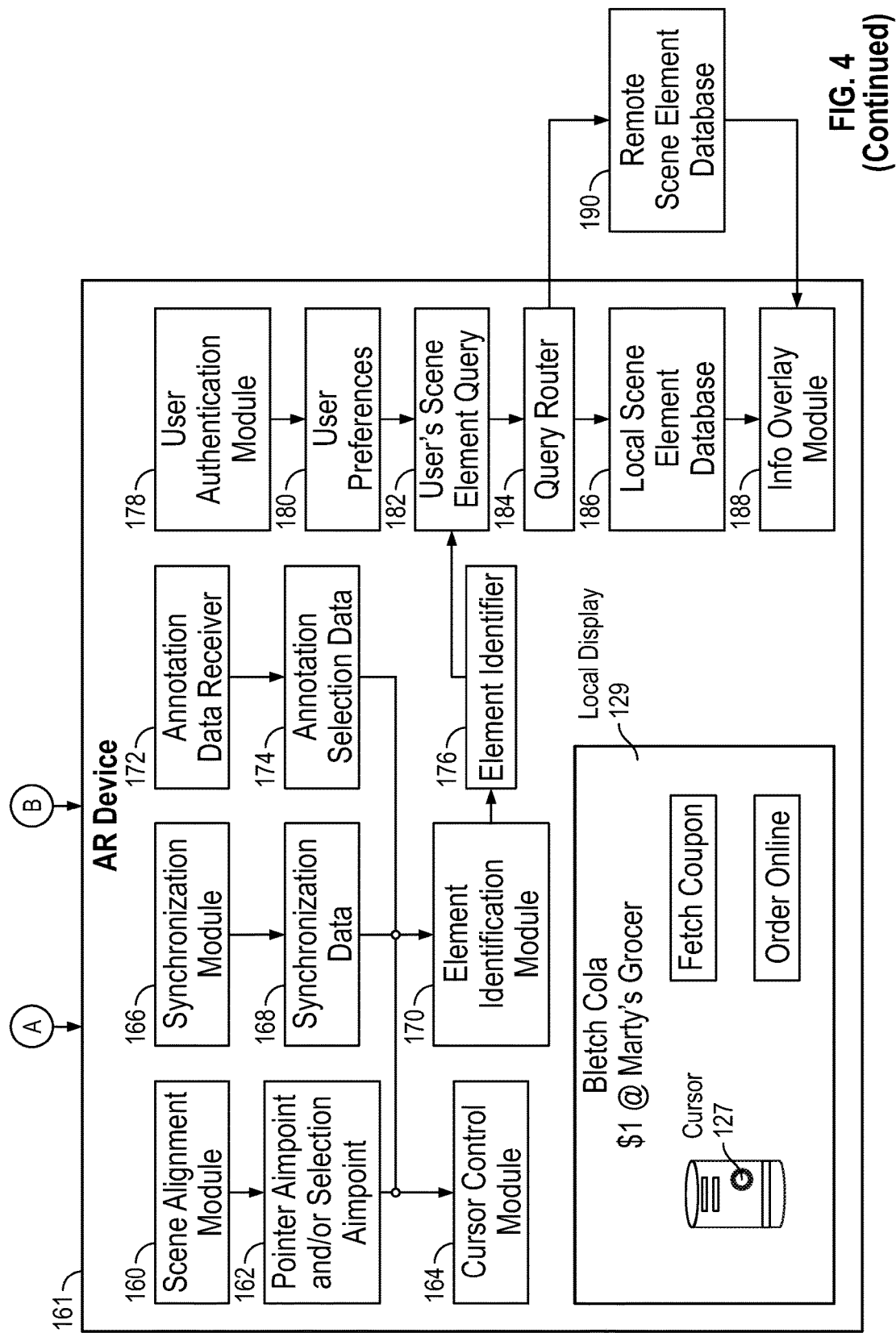
FIG. 4 illustrates a system that includes a user accessing a video annotation infrastructure through an augmented reality device, in accordance with the disclosed embodiments.

FIG. 4 illustrates a system 400 that includes a user 122 accessing a video annotation infrastructure through an augmented reality device 161, in accordance with the disclosed embodiments. Here, the augmented reality (AR) device 161 can include a local display that the user 122 can observe, a video camera, and other devices for additional functionality. One example is that the display is a movie screen and the user 122 is one of many people watching a movie in a theater. The multimedia display device 121 in this example can include a movie screen and projector. The movie screen can include markers that help the AR device 161 determine the screen location and distance. The user 122 can watch the movie through the AR device 161 with the AR device 161 introducing a cursor into the user's view of the movie.

In the particular embodiment or example shown in FIG. 4, the AR device 61 can be one having a forward pointing camera and a display presenting what is in front of the AR device 161 to the user 122. In essence, users can view the world through their own eyes or can view an augmented version by viewing the world through the device. As seen in FIG. 4, the user 122 is aiming the camera at the display and is, oddly, watching the display on a secondary display 129 almost as if the AR device 161 is a transparent window with the exception that the secondary display 129 can also present annotation data, can zoom in or out, and can overlay various other visual elements within the user's view.

The AR device 161 can thus include a number of modules and features, such as, for example, a scene alignment module 160, pointer aim point and/or selection aim point 162, and a cursor control module 164. Other possible modules and/or features can include a synchronization module 166, and an element identification module 170, along with an annotation data receiver 172, annotation selection data 174, and a user authentication module 178 along with user preferences 180, element identifier 176, user's scene element query 182, a query router 184, a local scene element database 186, and an information overlay module 188. The display 129 can be, in some examples, a local display. The information overlay module can also access, for example, data from a remote scene element database 190.

In the movie theater scenario discussed above, the theater can transmit synchronization data 168, for example, as a service to its customers, perhaps as a paid service or premium service. The AR device 161 can include a synchronization module 188 that obtains synchronization data 168 from some other source, perhaps by downloading video fingerprinting data or by processing signals embedded within the movie itself.

The scene alignment module 160 can locate the display position from one or more of the markers 153, 155, and 157, by simply observing the screen edges, or some other means. The display position can be used to map points on the local display, such as the cursor, to points on the main display (movie screen). Combining the cursor position and the synchronization data gives the cursor coordinate. Annotation selection data can be downloaded into the AR device 161 as the movie displays, ahead of time, or on-demand. Examining the annotation selection data for the cursor coordinate can yield the element identifier 176.

The user authentication module 178 is depicted within the AR device 161. In practice, and as discussed in relation to system 100 of FIG. 1, any of the disclosed pointing scenarios can include the use of an authentication module such as user authentication module 178. In some embodiments, the passive pointer 113 of FIG. 2, for example, can include authentication by recognizing the user's face, movements, retina, or pre-selected authentication gesture. User authentication is useful because it provides for tying a particular person to a particular purchase, query, or action.

The query router 144 can send queries to various data servers perhaps including a local data store within the AR device 161 itself. The query results are gathered and passed to an overlay module for presentment to the user 122 via the HHD 120 and/or via the multimedia display 126 and/or the multimedia display 129. The local display 129 on the AR device 161 shows the cursor 127 and the query results overlaid on top of the displayed image of the movie screen. Here, a movie can be used as an example whereas the display the user is viewing through the AR device 161 can be any display such as a television in a home, restaurant, or other social venue.

Figure 5:
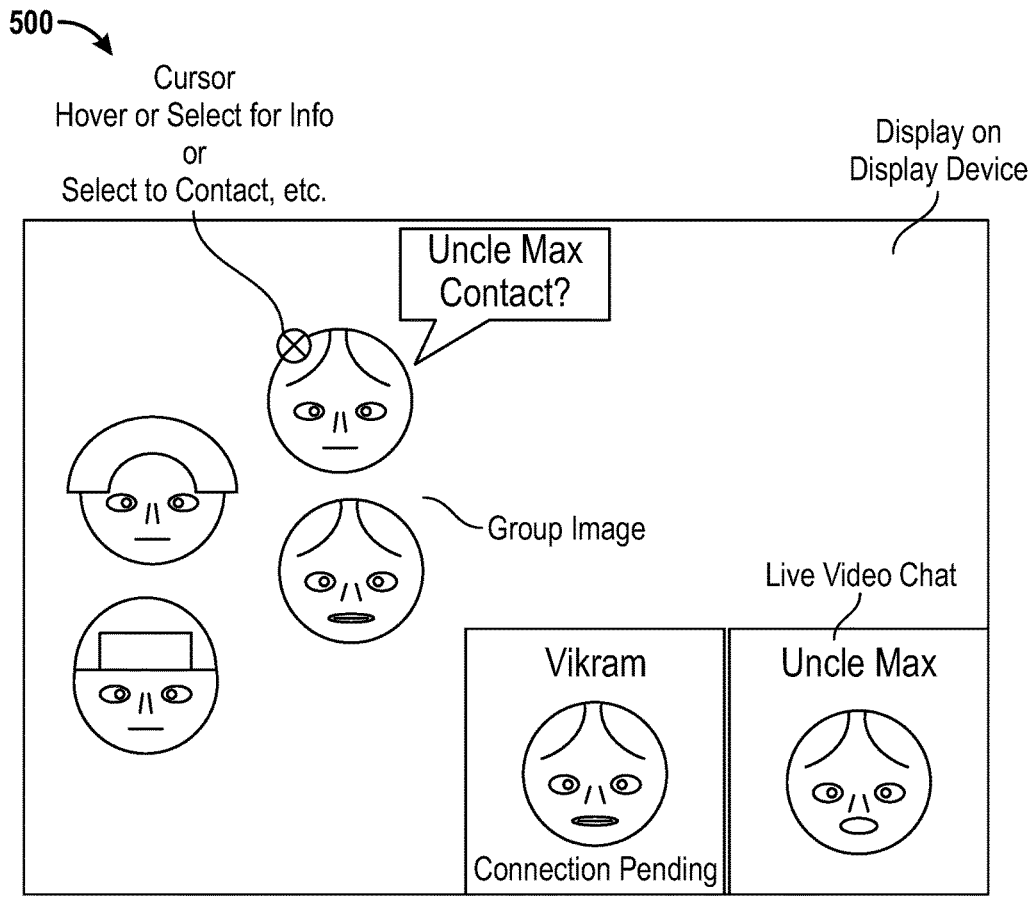
FIG. 5 illustrates an annotated group video of a user's social contacts, in accordance with the disclosed embodiments.

FIG. 5 illustrates an annotated group video 500 of a user's social contacts, in accordance with the disclosed embodiments. Automated facial recognition applications already exist for annotating still images; this video version combines the selectable areas of single images into the selectable zones of annotated video. In this application, selection of a scene element equates to selecting a person. The selection event can trigger bringing up the persons contact information, personal notes, and can even initiate contact through telephone, video chat, text message, or some other means. Additionally, lingering the cursor (or a sensed finger over a touch sensitive screen) over a face can bring up that person's information.

An interesting variation is that crowd videos or images can be artificially created. For example, an image of a friend can be isolated within a picture or video to create content with only that one person. The content from a set of friends or contacts can be combined to form a virtual crowd scene. This, combined with today's pinch-to-zoom type technology for touch screens yields an interesting interface to a contacts database. Selecting a person with the cursor or by tapping a touch screen overlying the display can automatically open a video chat window, such as the "Vikram" window that can have Vikram's image and an indication that Vikram hasn't responded. Examples of a "not-connected" or "pending" indicator can include a dimmed or grayed window, a thin border frame, and an overlaid pattern such as the "connection pending text" shown or a connection pending icon. An established connection can be indicated by a different means, such as the thick border frame shown in FIG. 5.

Figure 6:
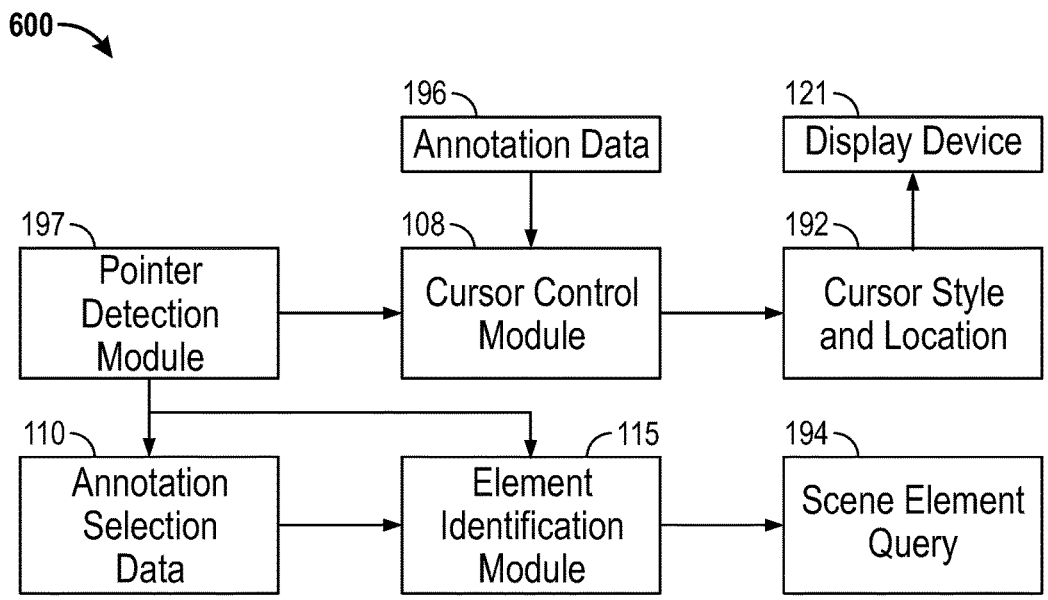
FIG. 6 illustrates a system which includes differences between cursor control and element identification, in accordance with the disclosed embodiments.
Figure 8:
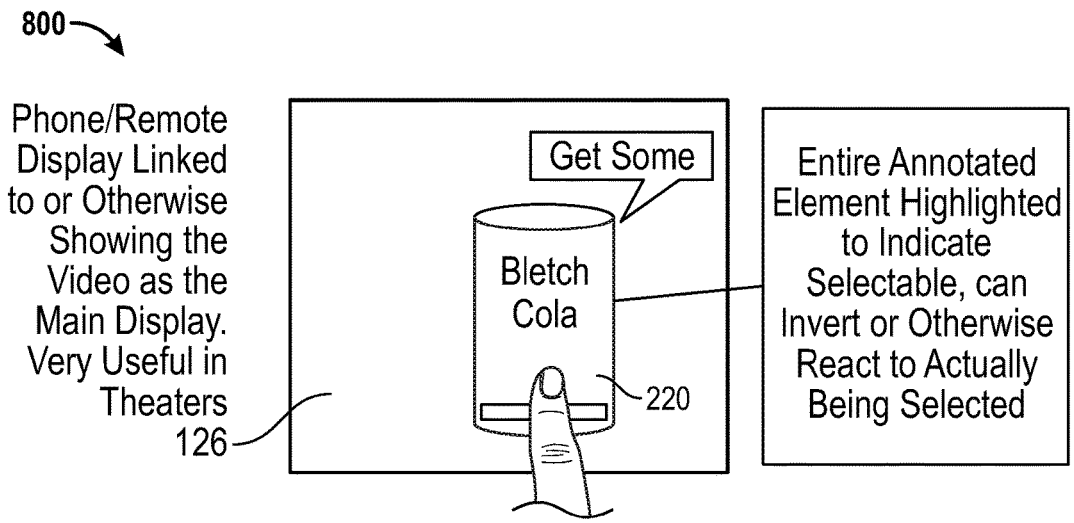
FIG. 8 illustrates a graphical view of a system that includes a multimedia display with an annotated element, in accordance with the disclosed embodiments.

FIG. 6 illustrates a system 600, which includes differences between cursor control and element identification, in accordance with the disclosed embodiments. System 600 includes, for example, a pointer detection module 197 which can send data to cursor control module 108, which in turn can provide data 192 indicative of cursor style and location, which can be provided to, for example, a display device such as display device 121 or even secondary displays such as multimedia display 129. Annotation selection data 110 can also be provided to the element identification module 115. As shown in FIG. 8, the pointer detection module 197 can determine a cursor coordinate. As already discussed, a cursor coordinate can include both a location on a display screen and a time stamp for synchronizing the time and position of the cursor with the time varying video image. The annotation data 196 can include selection zones such that the cursor control module determines if the cursor coordinates lies within a selection zone and determines the cursor style and location to present on the display device. Note that this example assumes that only default "selectable" and "not-selectable" styles are available.

Element identification requires slightly more information and the figure indicates this by show "annotation selection data" that can be the selection data augmented with element identifiers associated with each selectable zone. The element identification module receives data from a selection event that includes the time stamp and the cursor display location at the moment the selection was made. Recall that a selection can be made with an action as simple as clicking a button on a pointing device. The element identification module 115 can examine the annotation data 196 to determine which, if any, selectable zone was chosen and then determines the element Id associated with that selection zone. The element ID can then be employed for formulating a scene element query 194.

Note that the examples do not account for differently sized displays with different resolutions. Mapping all displays to a normalized size, such as a 1.0 by 1.0 square, and similarly maintaining the selection zones in that normalized coordinate space can compensate for different display sizes. The aim point can be translated into normalized space to determine if the cursor location lies within a selectable zone. For example, a screen can be 800 pixels wide and 600 pixels tall. The pixel at screen location (80, 120) would have normalized location (80/800, 120/600)=(0.1, 0.2). This normalization example is intended to be non-limiting because a wide variety of normalization mappings and schemes are functionally equivalent.

Also note that the examples do not account for windowed display environments wherein a graphical user interface can present a number of display windows on a display device. Windowed display environments generally include directives for mapping a cursor location on a display into a cursor location in a display window. If a video is played within a display window, then the cursor location or aim point must be mapped into "window coordinates" before the cursor coordinate can be determined. Furthermore, different window sizes can be compensated for by mapping all displays to a normalized size as discussed above and similarly maintaining the selection zones in that normalized coordinate space.

Figure 7:
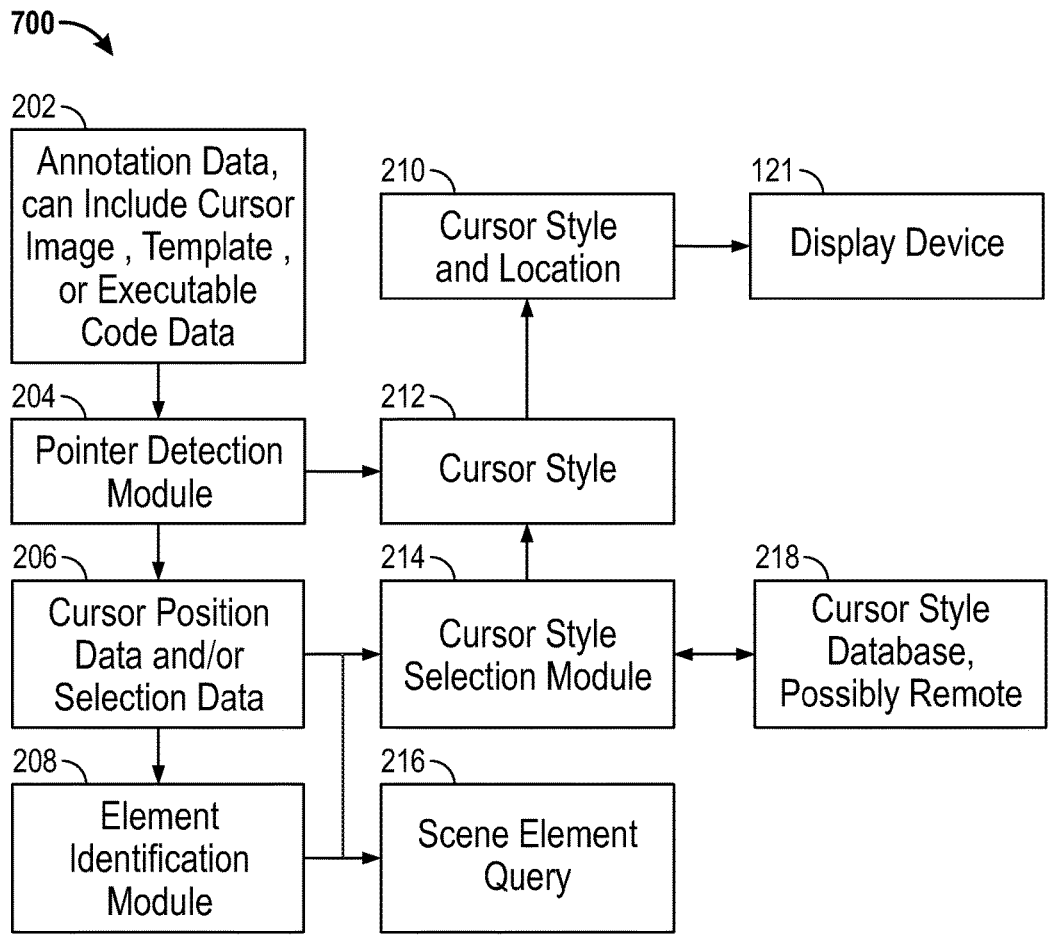
FIG. 7 illustrates a system that depicts additional processes and methods of cursor selection, in accordance with the disclosed embodiments.

FIG. 7 illustrates a system 700 that depicts additional processes and methods of cursor selection, in accordance with the disclosed embodiments. As indicated at block 202 in FIG. 7, annotation data can include, for example, a cursor image, template, and/or executable code data. Such information can be provided to a pointer detection module 204, which in turn can generate cursor style data 212, including, for example, custom style and location information 210, which in turn is transmitted to a display device, such as, for example, multimedia display device 121 and/or other multimedia display devices. The pointer detection module 204 also provides for cursor position data and/or selection data, as shown at block 206. Such data can be provided to, for example, a cursor style selection module 214, which can communicate with and retrieve data from, for example, a cursor style database 218. Such a database 218 may be, for example, a remote database retrieved over, for example, a data network such as the Internet. The data shown at block 206 can also be provided to an element identification module 208, which in turn can generate a scene element query 216. Note that FIG. 7 is about having different on-screen cursors based on what selectable element is under the cursor. Content developers can choose, for example, the cursor and an updateable database allows selection to be altered over time.

Cursor styles and actions can be dependent of the selectable or non-selectable zone containing the cursor. A cursor style is the cursors appearance. Most users are currently familiar with cursor styles such as arrows, insertion points, hands with a pointing finger, Xes, crossed lines, dots, bulls eyes, and others. An example of an insertion point is the bunking vertical bar often used within text editors. The blinking insertion point can be created in a variety of ways including an animated GIF, or executable computer code. An animated GIF is a series of images that are displayed sequentially one after the other in a continuous loop. The blinking cursor example can be made with two pictures, one with a vertical bar and the next without. Another property of cursors is that they often have transparent pixels as well as displayed pixels. That is why users can often see part of what is displayed under the cursor. The insertion point can alternatively be created with a small piece of executable code that draws the vertical bar and then erases it in a continuous loop.

The specific cursor to be displayed within a selectable zone can be stored within the annotation data, can be stored within a media device or display device, or can be obtained from a remote server. In one example, the cursor enters a selectable zone and thereby triggers a cursor style selection module to query a cursor style database to obtain the cursor to be displayed. In another example, the annotation data can contain a directive that the cursor style be obtained from a local database. The local database can return a directive that the cursor be obtained from a remote database. The chain of requests can continue until eventually an actual displayable cursor is returned or until an error occurs such as a bad database address, a timeout, or another error. On error, a default cursor can be used. Cursor styles that are successfully fetched can be locally cached.

Note that the infrastructure for obtaining a cursor style has many components that are identical or similar to those for obtaining element data. In many systems, moving the cursor into a selectable result in a "cursor entry" event that triggers the various actions required for changing the cursor appearance. A similar event, "cursor exited" can be triggered when the cursor leaves the selectable zone. Notice that with a simple image display these events only occur when the cursor moves into and out of a selectable area. Video data, having a time axis as well as the other axes, can have selectable zones that appear, move, and disappear as the video is displayed. As such, the cursor entered and cursor exited events can occur without cursor movement.

Another event is the "hover event" that can occur when the cursor remains within a selectable zone for a set period of time. A hover event can cause a change within or near the selectable zone. One example is that a small descriptive text box appears.

FIG. 8 illustrates a graphical view of a system 800 that includes a multimedia display 128 with an annotated element 220, in accordance with the disclosed embodiments. FIG. 8 thus depicts a change within the selectable area wherein a finger is detected within the selectable zone associated with a can of Bletch Cola. The video can be streamed to the user's display device or the user can be using a device such as that shown in FIG. 4. At first, an event such as the cursor entered event is triggered and as a result the Bletch Cola is highlighted as shown in the figure. If the finger remains within the zone, then the "Get Some" text box can be displayed in response to a "hover" type event that is triggered when the finger remains with the selectable zone for more than a preset time period. A selectable zone can be highlighted in a variety of ways such as by brightening all the individual pixels (e.g., increasing the RGB color values), brightening pixels having certain values or properties, tinting pixels, or passing the pixels through an image filter. Image processing software such as Photoshop and the GIMP has a wide variety of image filters that can be applied to standard images. These filters can be applied to video data by applying them to each video frame. Furthermore, the selectable zone can define a filter mask for each frame so that the image filtering operations appear within the selectable zone and can even appear to move with the selectable zone.

Figure 9:
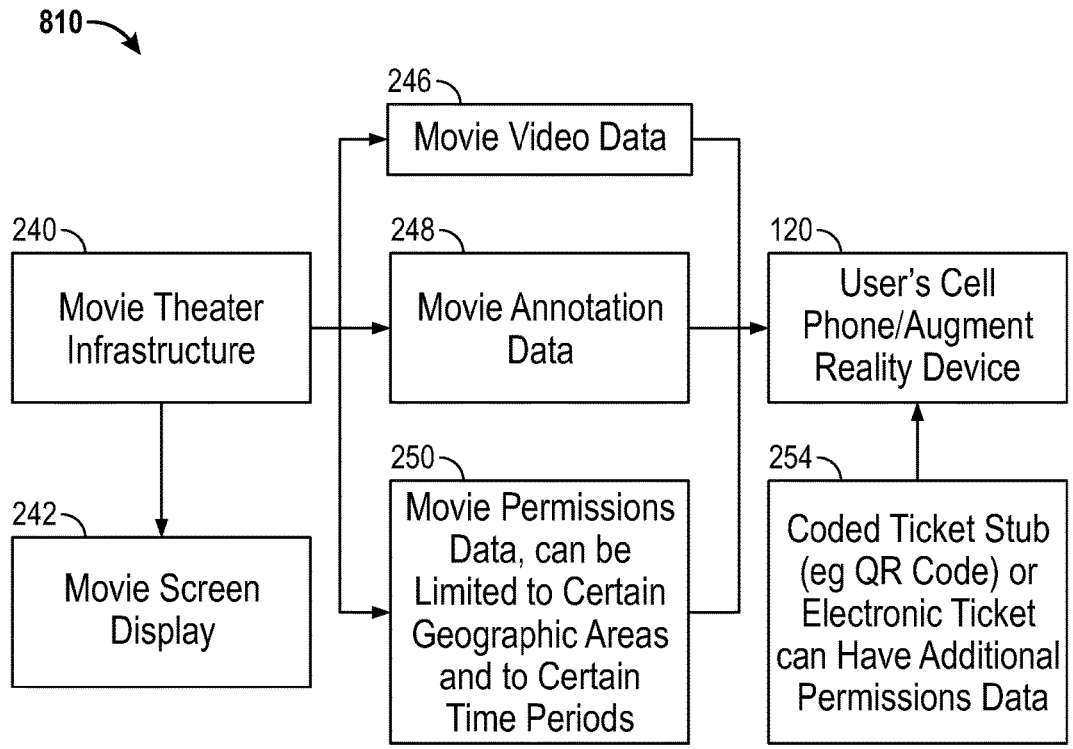
FIG. 9 illustrates a system utilizing annotated video with a setting have multiple independent users viewing a single display such as a movie screen, in accordance with the disclosed embodiments.

FIG. 9 illustrates a system 810 utilizing annotated video with a setting have multiple independent users viewing a single display such as a movie screen, in accordance with the disclosed embodiments. System 810 generally includes, for example, a movie theater infrastructure 240 and a movie screen display 242. Movie video data 248 and/or movie annotation data 248, and/or movie permission data 250 (e.g., can be limited to certain geographic areas and to certain time periods in some embodiments) can be provided to, for example, a HHD 120, which may be, for example, a Smartphone, a user's AR device, a pad computing device, etc. Coded ticket stubs (e.g., QR code) or an electronic ticket can have additional permissions data, as indicated at block 254, which also may be provided to the HHD 120.

An important aspect of this embodiment is that users do not interfere with each other's enjoyment of the movie unless invited to do so. The venue can display video on a large display while also providing movie annotation data to people watching the video through augmented reality devices as discussed above in reference to FIG. 3. The venue can also stream video data or annotated video data so that a user with a cell phone type device can view the large display or can view an augmented but smaller version on the cell phone. One of the issues that arise whenever users have camera within any venue is piracy. For example, people can use augmented reality devices or cell phones to record a movie as they watch it.

Transmitting permission data to the user's device so that the user can record the movie and/or watch the recording only when located within a certain space or within a certain time period can control recording. Examples include allowing the recording to be viewed only within the theater or on the same day as the user viewed a movie. GPS or cell tower triangulation type techniques are often used to determine location. The user's ticket to the venue can contain further permission information so that only paying customers can make recordings. Furthermore, the user can purchase or otherwise obtain additional permissions to expand the zones or times for permissibly viewing the recording.

Figure 10:
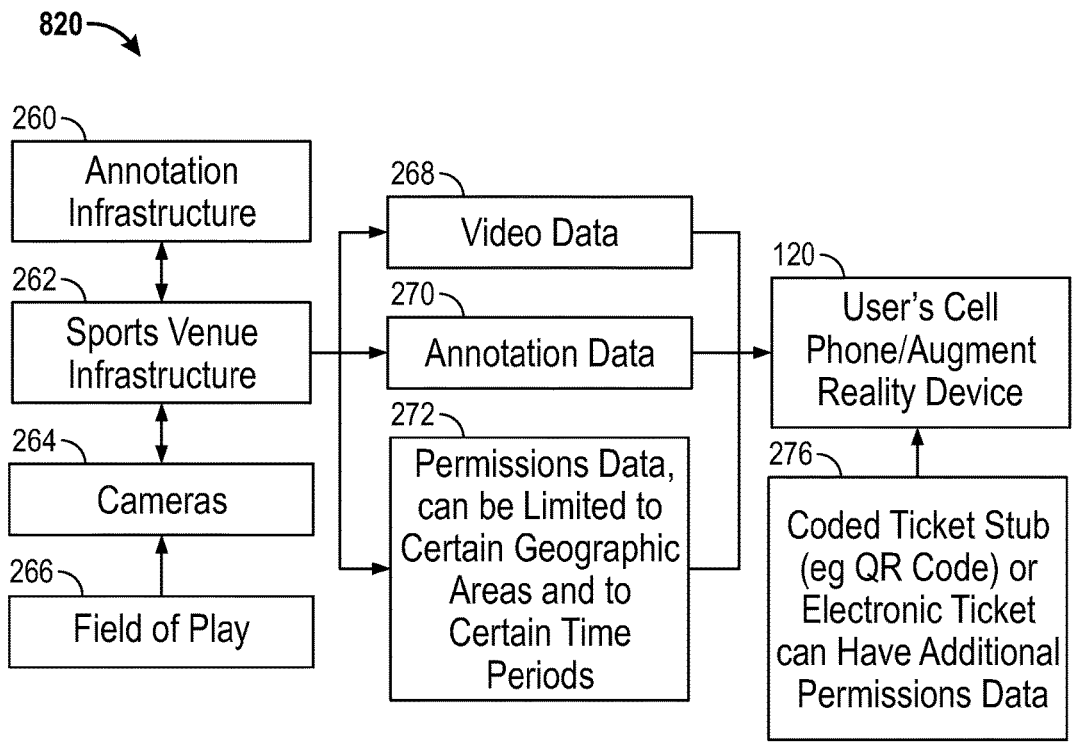
FIG. 10 illustrates a system similar to that of system of FIG. 9, but adapted for sports venues, music venues, theatrical events, and other events (e.g., political conventions, trade shows, etc.) in accordance with the disclosed embodiments.

FIG. 10 illustrates a system 820 similar to that of system 810 of FIG. 9, but adapted for sports venues, music venues, theatrical events, and other events (e.g., political conventions, trade shows, etc.) in accordance with the disclosed embodiments. System 820 can include, for example, an annotation infrastructure 260, a sports venue infrastructure 262, one or more video cameras or other video recording devices and systems 264 with respect to a field of play shown at block 266. Video data 268, annotation data 270, and permissions data 272 (can be limited to certain geographic areas and to certain time periods) can be transmitted from a sports venue infrastructure 262 to, for example, a HHD 120 (e.g., user's Smartphone, pad computing device, AR device, etc.).

In some embodiments, the venue displays the action on a big screen and the user records that. In other embodiments, the venue streams camera data from numerous cameras and the user chooses one or more camera view. In yet other embodiments, users can point their own cameras (such as the AR device's front facing camera) directly at the field of play. Live venues can annotate video data in near real time to thereby provide users with a full FlickIntel experience.

Figure 11:
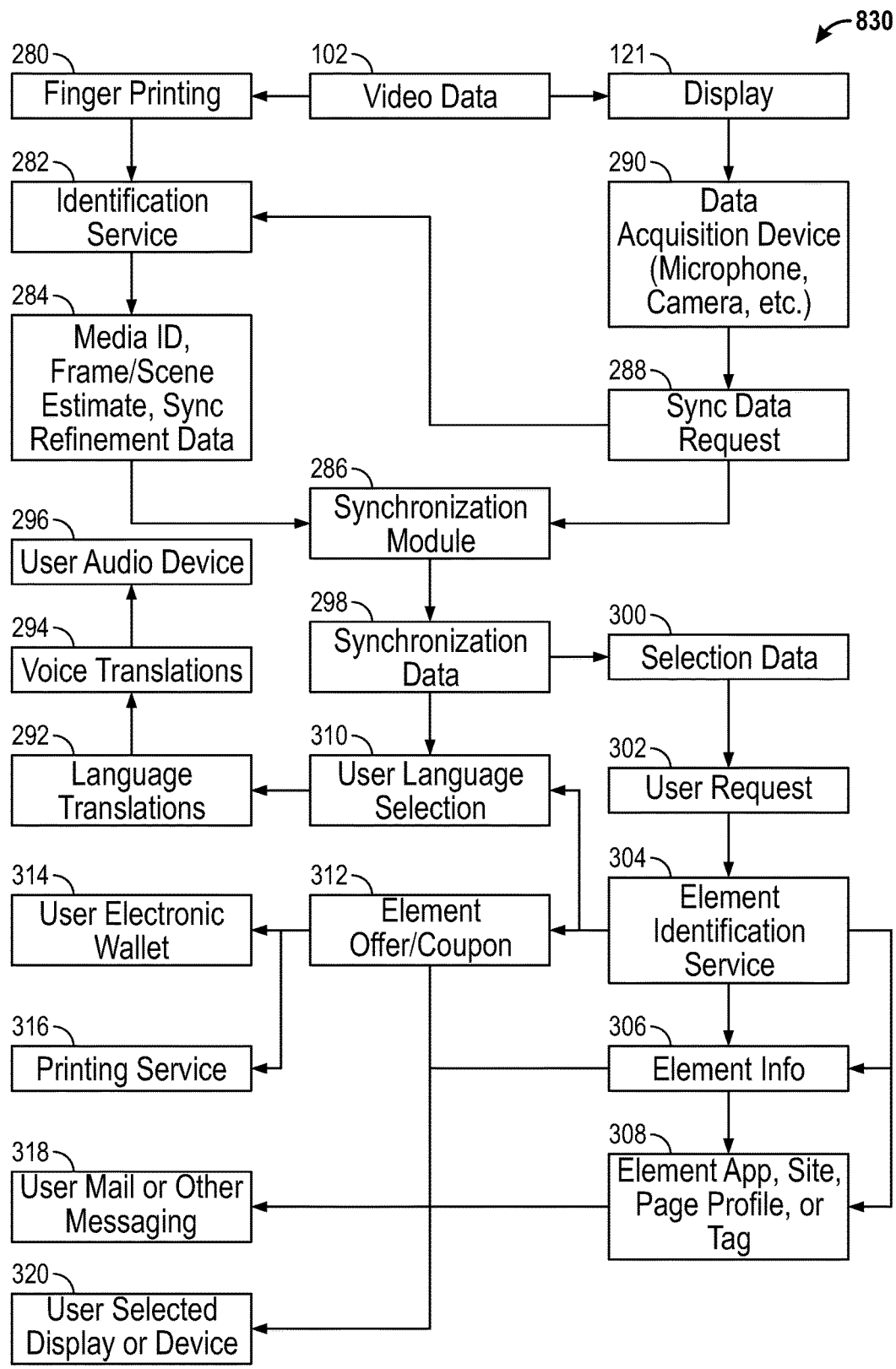
FIG. 11 illustrates a system, in accordance with the disclosed embodiments.

FIG. 11 illustrates a system 830, in accordance with the disclosed embodiments. System 830 includes a number of potential features and modules, such as, for example, finger printing, as indicated at block 280. Video data 102 can be provided to a finger printering module 280 and/or a multimedia display device such as, for example, display device 121. A data acquisition device 290 (e.g., microphone, camera, etc.) can receive data from display 121 and be subject to a synchronization data request as depicted at block 288.

An identification service 282 can, for example, respond to the synchronization data request 288 and provide data 284 (e.g., media ID, frame/scene estimate, synchronization refinement data).

A synchronization module 286 can receive data 284 and data indicative of a synchronization data request 288 and can transmit synchronization data 298, which in turn provides selection data 300 and user language selection 310. A user request 302 based on selection data 300 can be transmitted to an element identification service 304, which in turn generates element information 306 and other data 308 (e.g., element app, site, page, profile or tag), which can be provided via messaging 318 (e.g., user email or other messaging). The element deification service 304 also provides for user language selection 310, which in turn can be provided to a language translation module 292, which in turn can be provided for digital voice translations 294 which are provided to a user audio device 296. The element identification service 304 can also generate an element offer/coupon 312 which can provide a user electronic wallet 314 and a printing service 316. The element offer/coupon 312 can also be rendered via a user selected display or device 320.

It is important that the annotation data be synchronized with the displayed video and various synchronization means have been presented. System 830 of FIG. 11 includes aspects of a fingerprinting service. Video data, including the audio channel, can be fingerprinted by analyzing it for certain identifying features. Video can be fingerprinted by simplifying the image data by, for example, converting color to grey scale having at least one bit per pixel to thereby greatly reduce the amount of data per video frame. The frame data can also be reduced by transform techniques. For example, one of the current video image compression techniques is based on the discreet cosine transform (DCT). DCT coefficients have also been used in pattern recognition. As such, compressed video already contains DCT descriptors for each scene and those descriptors can be used as fingerprints. Furthermore, video is a sequence of images and thereby presents a timed sequence of descriptors. It is therefore seen that current video compression technology provides one fingerprinting solution. In addition, the compression type algorithms can be applied to reduced data such as the grey scaled video or lower resolution video to provide fingerprints that are quicker to produce and match.

A display device or media device can calculate fingerprints for the video data being presented to a user. Alternatively, a camera, such as that of an AR device, can record the displayed video data and fingerprints be calculated from the recording. The fingerprint calculations can be calculated in near real time and submitted to an identification service. The identification service comprises a massive search engine containing fingerprint data for numerous known videos. The identification service accepts the fingerprints for the unknown video, matches them to a known video, and returns synchronization data. The search engine can determine a number of candidates to thereby reduce search size and can continue to receive and process fingerprints of the unknown video until only one candidate remains. Note that two of the candidates can be the same movie at different times. The fingerprint data can be calculated from a single video frame, a sequence of video frames, a portion of the soundtrack, or a combination of these or other data from the video.

Figure 12:
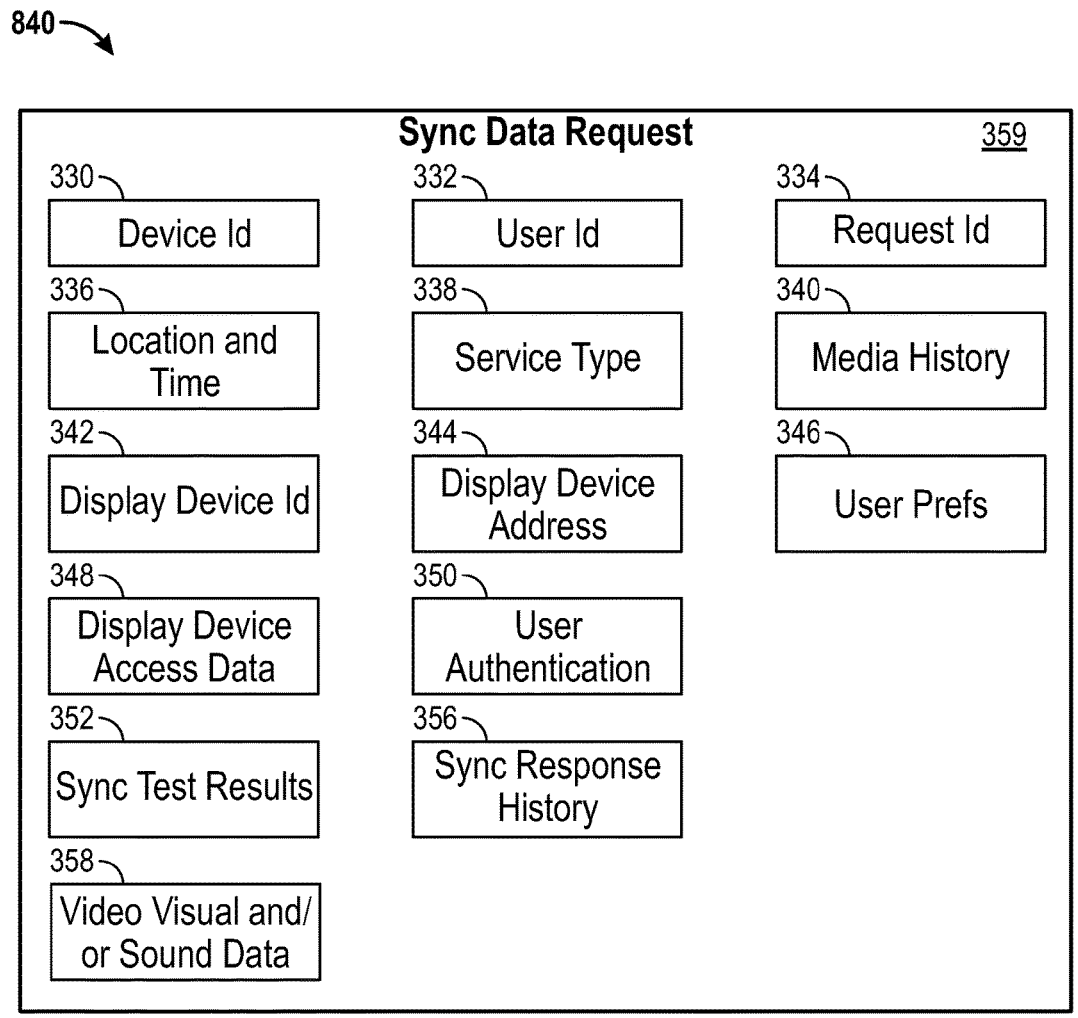
FIG. 12 illustrates a system depicting a Sync Data Request that can be sent to an identification service, in accordance with an embodiment.

FIG. 12 illustrates a system 840 depicting a Sync Data Request 359 that can be sent to an identification service, in accordance with an embodiment. Other embodiments can have additional or fewer elements. A Video Visual and/or Sound Data field 358 can include fingerprint data for the unknown video that is to be identified. Many of the illustrated elements can be used to reduce the size of the identification service's search. The User Id 332 identifies the user such that the user's viewing habits can be tracked. A fan of a certain weekly show is likely to be watching that show at a specific time every week. A Device Id 330 has similar utility. Location and time information 336 can be used to limit an initial search to whatever is being transmitted at that location and time. Note that the time is not too useful unless the user is watching a recording, in which case the recording time can be included in the request. Media History 340 can be used to target the initial search at one or more shows or genres. Service type 338 can indicate satellite service, over the air, cable, or streamed which when combined with location and time (i.e. block 336 labeled "Location and Time") greatly limit the search. Service, location, time, and channel in combination are almost certain to limit the search to a single show.

User authentication data 350 can be used to verify the user, to limit the identification service to only authorized or subscribing users, and even to tie criminal or unlawful acts, such as piracy or underage viewing, to a specific viewer. The request id 334 is typically used to identify a matching response. Display Device Id 342 and Address 344 can be used favorably when the display device is a movie screen or similar device at a public venue because many requests from the same venue can be combined and because the identification service might already know what is being displayed by the display device. User preferences 346 can also be designated. Note that device id 330 and the display device id 342 may be unique because the device id 330 can refer to, for example, an AR device or to a device (e.g., Smartphone) with a display slaved to a primary display that has the display device id. Sync response history 356 can indicate recent responses from the identification service because it is likely that a user has continued watching the same video. Synch test results 352 can also be provided.

Figure 13:
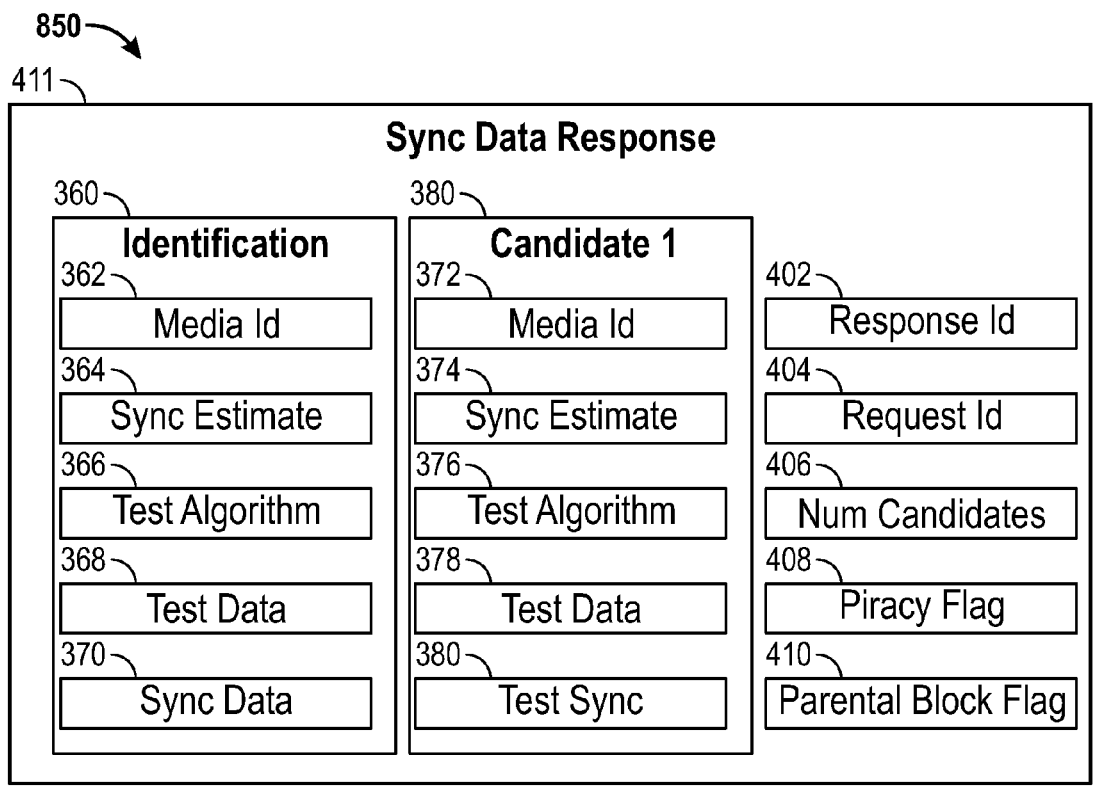
FIG. 13 illustrates a system that includes a Sync Data Response that an identification service can send in response to a sync data request, in accordance with an embodiment.

FIG. 13 illustrates a system 850 that includes a Sync Data Response 411 that an identification service can send in response to a sync data request, in accordance with an embodiment. Other embodiments can have additional or fewer elements. A response Id 402 can be included and used later in a request's sync response history, such as the sync response history 356 shown in FIG. 12. A request Id 404 can refer to a sync data request for which a sync data response is being sent. Note that a single request can result in numerous responses if the system is configured to process numerous responses. A piracy flag 408 can indicate that the video has been identified and appears to be being pirated, stolen, or used in violation of copyright based on the User Authentication, User Id, or other data. A parental block flag 410 can indicate that the video has been identified and that it appears that the user shouldn't be viewing it based on the user's age or on permissions or policies set for the user by the user's parent, guardian, or overseer. The 'Num Candidates' field 406 indicates the number of candidate videos are being indicated in the data sync response.

The identification field 360 indicates that the video has been positively matched. A Media Id 362 and a timestamp are sufficient for identifying a frame in a video. Therefore, the identification field 360 can include nothing more than a media Id 362 and a sync estimate 364. The sync estimate 364 can be a timestamp or functionally equivalent information that can specify a frame in the identified media. The time difference between sending the request and receiving the response can be indeterminate and significant enough that the sync estimate is not precise enough and the user experience feels delayed, out of sync, jittery, or unresponsive. Test data 368 and a test algorithm 366 can be used to refine the sync estimate. The test data 368 can include the sync estimate and/or some of the fingerprinting data from the identification service 360. The test algorithm field 366 can specify which test algorithm to use or can include a test algorithm in the form of executable code. In any case, certain embodiments can have a synchronization module that can use a test algorithm on the test data and the video visual or sound data to produce or refine a sync estimate. A sync data field 370 is also shown The identification service 360 can submit one or more candidates when the video has not been positively identified. Candidate field 380 is thus shown in FIG. 13 and refers to a first candidate, but additional candidate fields can be provided for other candidates. Candidate field 380 thus includes media id 372, sync estimate 374, test algorithm 376, test data 378, and a test sync field 382. The candidate field 380 can contain data very similar to that in an identification field 360 such that all of the candidates can be tested to determine which, if any of the candidates are the unidentified video. In many cases a threshold test, a best match, a likelihood test, some other test or some combination of tests can be used to determine when the video has been positively identified.

One interesting case is when a scene has been positively identified, but the scene is included in multiple videos. This case can occur when stock footage is used and when different versions exist such as a director's cut and a theatrical release. In these cases, candidates can be submitted to a synchronization module but with sync estimates that are in the future. The synchronization module can test the candidates anytime the needed fingerprint data from the unidentified video is available. In some cases, such as when a video stream is being viewed as it is downloaded, the needed fingerprint data will become available only after the time offset of the future sync estimate is reached. In other cases, the entire video is available such as when it is on a disk or already downloaded. In these cases, the candidate having a sync estimate in the future can be tested immediately because all the needed data is available.

Another case that can occur is when a sync data request is submitted without any fingerprinting data (video visual and/or sound data). The other data in the request can contain sufficient information to limit the number of likely candidates. For example, the time, location, service type, and channel can almost certainly be used to fully identify a video and a sync estimate when the video starts on time and proceeds at a predictable rate. Candidates can be returned to further narrow the search and the sync test results field contains data that helps guide the search engine. The sync test results field 352 shown in FIG. 12, for example, can also indicate when the identified video or the candidates do not match the unknown video.

Returning to FIG. 11, the synchronization module 286 can produce synchronization data 298 that can be used to keep the selection zones synchronized with the video and that can be used to synchronize alternative language tracks with the video. Videos are often streamed or distributed with only one or a select few languages. Typically, the video has a few audio tracks with different audio tracks having dialog in different languages. Dialog in additional languages can be distributed separately and can provide a good user experience if it is synchronized with the video. Multiple audio tracks can be mixed by, at, or near the user audio device with different tracks having different content. For example, some tracks can include background or other sounds that are not dialog and some other tracks can be dialog in various languages. Mixing data can specify relative sound levels and other details necessary for mixing the tracks. Here, track refers generically to electronically encoded audio that can include numerous audio channels for surround sound or stereo sound and with some tracks distributed with the video. For example, video, which includes some audio tracks, can be distributed on a data disk, a radio frequency transmission, satellite download, computer data file, or data stream. Additional audio tracks can be distributed separately via a data disk, a radio frequency transmission, satellite download, computer data file, or data stream.

The synchronization data 298 can be used to ensure that the additional tracks are played, perhaps after mixing with other tracks, in synchronization with the displayed video. A use can therefore select a video to watch and a preferred language. A system enabled according to one or more embodiments herein can then obtain dialog in the desired language, mix the sound tracks, and present the video to the user. The user will then hear dialog in the desired language. Certain embodiments can also include optionally displayed subtitles that can be rendered into video and overlaid on the video and in synchronization with the video. A further aspect is that a user can choose to have different actors speak in different languages. The different actors can each have audio tracks in different languages that can be mixed to provide a multilingual auditory experience.

The synchronization data 298 can also be used to keep the selection data synced up with the video. Selection data can be distributed separately from the video just as additional audio tracks can be. This is particularly true when the distributed video predates an enabled system or for some other reason does not already include selection data, annotation data, or synchronization data. Recall that it is the selection data that can specify the selection zones. A selection zone can be identified from a screen coordinate and synchronization data that specifies the video or media being displayed as well as a time, frame, or likely time period. The selection data can reside in either a local data store or a remote data store.

A user request can specify what the user wants. Recalling the local display 129 of FIG. 4, a first user request brought up options for "Bletch Cola" that included "fetch" and "order online". The options can be displayed to the user in a number of ways including as graphical overlays on a display, local display, or AR display. The graphical overlays are essentially screen elements with their own selection zones that are created in response to the first user request. A second user request, for example, a selection of "order online", can bring up a new set of options and selection zones for ordering some cola from an online merchant. Another possibility is that the user selects the "$1 @ Marty's Grocer" to obtain an electronic coupon or printable coupon for use at a merchant location. It is important to note that the various selection zones can be dynamically created and dismissed (perhaps by selecting an area outside the selection zones) and that the selection data for the dynamically created selection zones can be distributed in a wide variety of ways and can accessed locally or remotely.

A further note is that broadcasters often overlay advertising or information onto displayed video. Examples include station identifiers and graphics of varying levels of intrusiveness advertising television shows at other times. These can also be examples of dynamically created screen elements with selection zones. User action may not have caused these screen elements to appear, but those elements can be selected. The dynamically created screen elements can obscure, occlude, or otherwise overlay other selectable screen elements. The selectable elements and selection zones associated with a video overlay should usually take precedence, such that a user selecting an overlaying element does not receive data or a response based on an occluded or not-currently-visible screen element.

A user request can imply an element id by specifying a selection zone or can explicitly include the element id. In any case, element ids can have ambiguities. An element identification service can resolve ambiguities. For example, two different videos can use the same element id. An element identification service can use a media id and an element id to identify a specific thing. The element identification service can amend the user request to resolve any ambiguities and can send the user request to another service, server, or system to fulfill the user request. The illustrated examples include selecting a language, obtaining an offer for sale or coupon, obtaining information, or being directed to other data sources and services. The obtained information can be provided to the user, perhaps in accordance with the user request or a stored user profile, in email or another messaging service, or to a display device such as the user's cell phone, AR device, tablet, or television screen.

A user can be directed to other data services by being directed to an element app, site, page, profile, or tag. An element app is an application that can be downloaded and run on the user's computer or some other computing or media device. A site can be a web site about the identified element and perhaps even a page at an online store that includes a description and sale offer. A page, profile, or tag can refer to locations, information, and data streams within a social media site or service and associated with the identified element.

Returning to the multilingual example, a user can select a menu icon, a menu button, or in some other way cause a menu of viewing options to appear on one of the screens upon which the user can select screen elements. One of the options can provide the user with available voice translations at which time the user selects a language or dialect.

Figure 14:
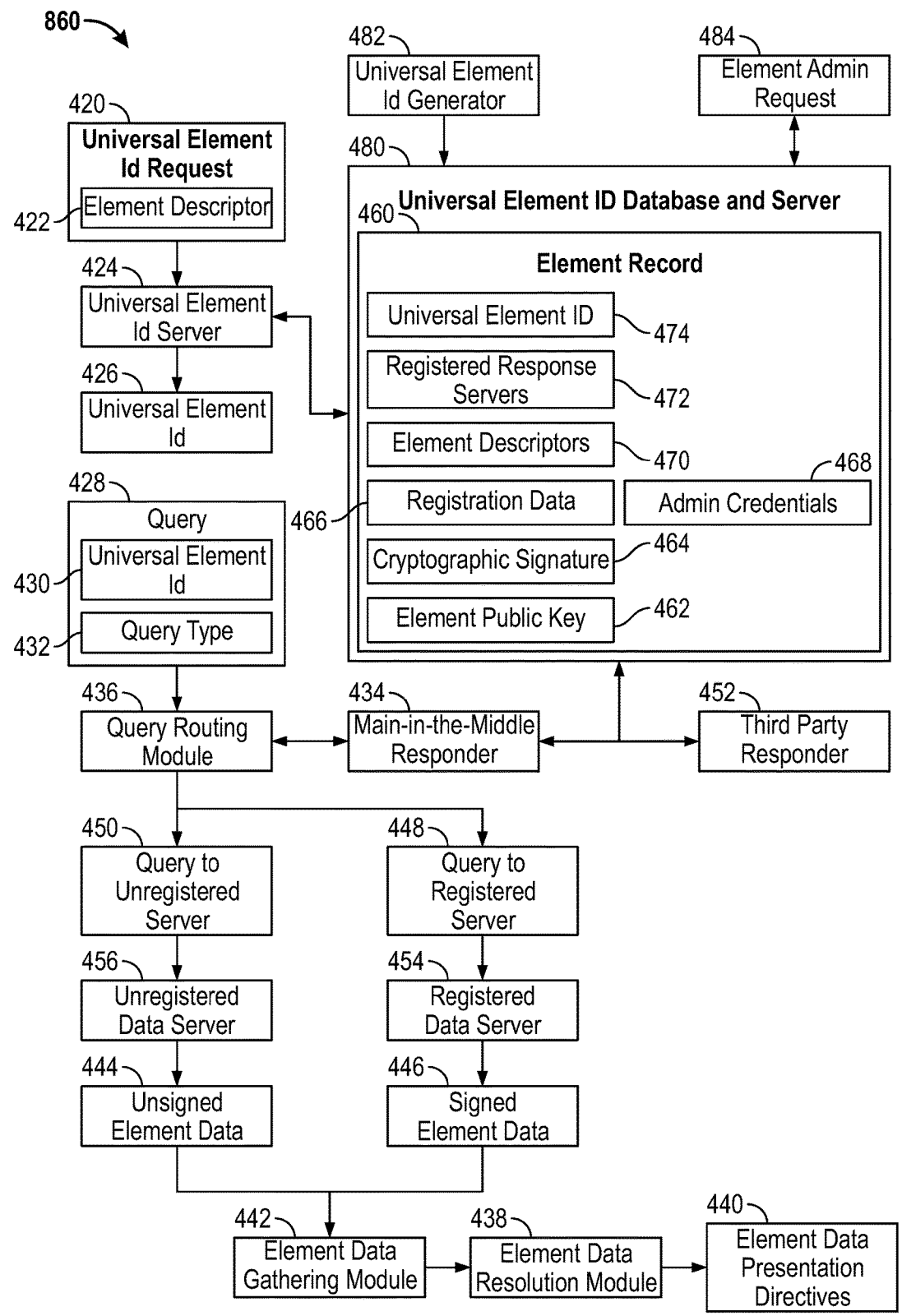
FIG. 14 illustrates a system for maintaining unique identifiers for elements that appear in videos and in using those unique identifiers for scattering and gathering user requests and responses, in accordance with the disclosed embodiments.

FIG. 14 illustrates a system 860 for maintaining unique identifiers for elements that appear in videos and in using those unique identifiers for scattering and gathering user requests and responses, in accordance with the disclosed embodiments. A universal element identifier (UEI) 420 is an identifier with an element descriptor 422 that is uniquely identified with a certain thing, such as "Bletch Cola", so that whenever that thing appears on screen with a selectable zone that it is associated with the UEI. For example, every advertisement and product placement of Bletch Cola can be associated with that one UEI thereby greatly simplifying the routing of and responses to user requests. A UEI generator may, for example, generate data for storage in a UEI database 480.

The UEI database 480 can be kept on one or more servers (e.g., server 424) with the database storing data including, for example, one or more element records, such as, for example, element record 460. The UEI database 482 may be responsive to, for example, an element admin request 484. The element record 460 can be created in response to a request that includes an element descriptor. The request can be sent to a (UEI) server 424 or directly to the database server 480. In many cases, to help ensure data security, the UEI server 424 and the database 480 can be maintained on separate computer systems having extremely limited general access but with widely available read only access for UEI servers. The element record 460 can contain data including, but not limited to, for example, the Universal Element Id 474, registered response servers 472, element descriptors 470, registration data 466, administrator credentials 468, a cryptographic signature 464, and an element public key 462. The UEI server 424 can generate a UEI 426.

A UEI request 420 is an example of an administrative request, an example of which is also shown at block 484. Element administrators can have read, write, and modify access to element records and should be limited to writing and modifying only those records for which they are authorized. Different records can have different administrators. Element administrators have far more limited access and rights than server or database administrators. Element records can contain admin credentials specifying who can administer the record or similar password or authentication data. The admin credential can also contain contact information, account information, and billing information (if the UEI is a paid service). In many cases the admin credentials can refer to an administrator record in a database table. The important aspects are that only authorized admins can alter the element record, that the admins can be contacted, and that the record can be paid for if it is a paid service. Paid services can have various fees and payment options such as one time fees, subscription fees, prepayment, and automatic subscription renewal.

The element descriptor 422 is data describing the thing that is uniquely identified. It can be whatever an element record admin desires such as simply "Bletch Cola" or something far more detailed. Registration data can include a creation date and a log of changes to the record. It can be important that responses to user queries come from valid sources because otherwise a miscreant can inject a spurious and perhaps even dangerous response. A cryptographic signature and element public key are two parts of a public key encryption technique. Selectable zones and UEIs can include or be associated with a public key. Responses to user queries can be signed with the cryptographic signature and verified with the public key. Similarly, the queries can be signed with the public key and verified with the cryptographic signature.

The element record 460 can contain a list of registered response servers. A query routing module 436 can obtain the list of registered response servers and direct user queries to one or more of the registered servers as shown as block 448. Note that a query to one or more unregistered servers is depicted at block 450, which in turn will provide data to an unregistered data server 456. Unsigned element data 444 and/or signed element data 446 may be output from the unregistered data server 456 and in turn can be provided to an element data gathering module 442, which in turn can provide data to an element data resolution module 438, which in turn can provide element data and presentation directives as shown at block 440.

A typical query 428 may contain, for example, a UEI 430 and a query type 432. The query routing module 436 can be a purpose built hardware device such as an Internet router or can be executable code run by a computing device. The list of registered servers can be obtained directly from the UEI database server 480 or from a different but authorized server (or responder) that has obtained the list. Public key techniques can ensure that the responder is authorized or that the response contains signed and valid data.

A man in the middle responder 434 can be authorized or can be relaying signed and authorized information. The man-in-the-middle responder 434 can communicate with a third party responder 452 and also the database/server 480. In the case of no or weak encryption, the man-in-the-middle responder 434 can provide spurious information and thereby cause the query routing module 436 to send the query to a hostile data server. For example, the makers of Bletch Cola would prefer that their own or only authorized servers respond to user queries having the UEI for their product. A competitor might want to send a different response such as a coupon for his or her own cola. A truly hostile entity such as a hacker might want to inject a response that compromises the user's media devices, communications devices or related consumer electronics.

In some scenarios, a network operator or communications infrastructure provider may desire to add, delete, or modify the registered response server list. Such modification is not always nefarious because it may be simply redirecting the queries to a closer server or a caching server. The network operator might also wish to intercept "UEI not found" type responses and inject other information that is presumably helpful to the user. In other cases, the network operator may intentionally interfere with disclosed systems and services by responding to user queries or registered response service requests with information about its own services, premium data charges, or reasons for not allowing the queries on its network.

Ideally the query routing module 436 will send the query to at least one registered data/response server that returns an element data, perhaps signed, that can be presented to the user. When multiple servers are responding, an element gathering module can collect the responses and format them for the user. A response gathering module can cooperate with the routing module such that it knows how many responses are expected and when to timeout on waiting for an expected response. An element data resolution module 438 can inspect the gathered responses and resolve them by removing duplicate data, deleting expired data, applying corrections to data, and other operations. Data can be corrected when it is versioned and the responses contain an older version of the data along with 'diffs' that can be applied to older versions to obtain newer versions.

The user query can also be sent to an unregistered data server with good or bad intent as discussed above. The unregistered server cannot reply with signed data unless the encryption technique is compromised. The data element gathering module or a similar module can discard unsigned or wrongly signed responses. Alternatively; the module can be configured to accept unsigned responses from certain sources or to accept wrongly signed responses with certain signatures. All responses can be treated the same once accepted and systems lacking encryption or verification capabilities will most likely accept all response to user queries.

Based on the foregoing, a number of options and features are possible. For example, a screen/display device/associated device that transmits an annotation signal can be provided that includes a media identifier as well as screen annotation data such that local devices (remotes; phones, etc.) can create "augmented reality" cursor and transmit cursor icon and location to display device, etc. Note that the video data may be in a narrative format that does not respond to user inputs except, perhaps, for panning and zooming around a scene.

In some embodiments, a system can be implemented which includes a display device presenting a display of time varying video data; annotation data comprising time and position based annotations of display elements appearing on the display; a pointing device that transmits a pointer signal wherein the pointing device comprises a selection mechanism (always on or only when button pushed); a pointer sensor that detects the pointer signal and determines a cursor location wherein the pointing device is pointing at the cursor location; a cursor presented on the display at the cursor location; and an annotation identification module that determines when an on-screen element is selected. Note that annotated video data can be video data that is associated with, bundled with, or distributed with annotation data. In another embodiment, the pointer signal can encode cursor data wherein the cursor data determines the on-screen cursor appearance. In another embodiment, the pointer signal can encode a pointer identifier. In yet other embodiments, the on-screen cursor can change appearance when overlying an annotated element. In still other embodiments, the pointing device can transmit the pointer signal when a pointer actuator is activated.

In yet other embodiments, a system can be implemented that includes annotated video data comprising annotation data; an annotation data transmitter that transmits the annotation data to a pointing device (e.g., kinect or camera based, for example, in the context of an AR browser). In a kinect version, cameras may detect where a person/passive pointer (like specially painted or shaped baton or weapon type thing) is pointing, in order to detect who the person is via facial recognition, biometric measurement, gesture as password, etc. In other embodiments, a contact list for video conferencing can be provided. In still other embodiments, a navigating screen with a remote control phone as a pointing device can be provided, and the phone camera and display used to aim an on-phone cursor at the display. Additionally, the phone camera and display can share images, poke phone, and the phone can send screen location data to the display which then treats it as a local selection. In a movie theater setting, a HHD can synch in on frame/position and communicates with a server. Also, theater/movie "cookies" can phone so that user can redisplay/rewatch movie for xxx time period such that queries can be made outside the theater. Additionally, it is not a requirement that the device (e.g., HHD) be aimed at the movie screen.

Additionally, tagged searches are possible. For example, YouTube can be searched by a tag so that people can tag the videos and then search on the tags. An extension is to tag movie scenes so that a media identifier and offset into the 'movie' comes back, perhaps even a link for viewing that scene directly. As a further refinement, someone can obtain a tag by selecting a screen element and assemble a search string by combining tags some of which are entered via keyboard and some via element selection.

Synchronization data can be obtained through a technique like the fingerprinting type technique described above or more simply by knowing what is being watched (media id or scene id) and how far into it the person is (time stamp or frame number). A person can tag a scene or a frame with any of the above mentioned devices (AR device, cell phone, remote control, kinect type device, pointing device, . . . ). Basically, click to select frame/scene, key in or otherwise enter in the tag, and accept. On accept, the tag and the sync data (includes media id) is sent off to be stored in a server. People can search the tag database to check out tagged scenes. For example, Joe tags a scene "explosion" and Jill tags the same scene "gas". A search for "gas explosion" can result in a link to watch the scene. A social media tie in is that Joe's friends might see that "Joe tagged a scene with 'explosion'" along with a single frame from the scene and embedded links to the scene. If an actor, "Kyle Durden" was blown up in the explosion, Joe's tag could have been assembled by selecting Kyle Durden in the scene and requesting a tag (assumes style annotated video) and then adding "explosion". The "Kyle Durden" tag can be the textual name, or a small graphic. The small graphic can be the actor's picture or a symbol or graphic people associate with the actor. Similarly, anything having a trademark (or service mark) can use that mark (word, logo, design, or combo mark) as a tag. Searching for such a tag requires entering it in some way such as by "clicking" on it via the pointing device or HHD.

Figure 15:
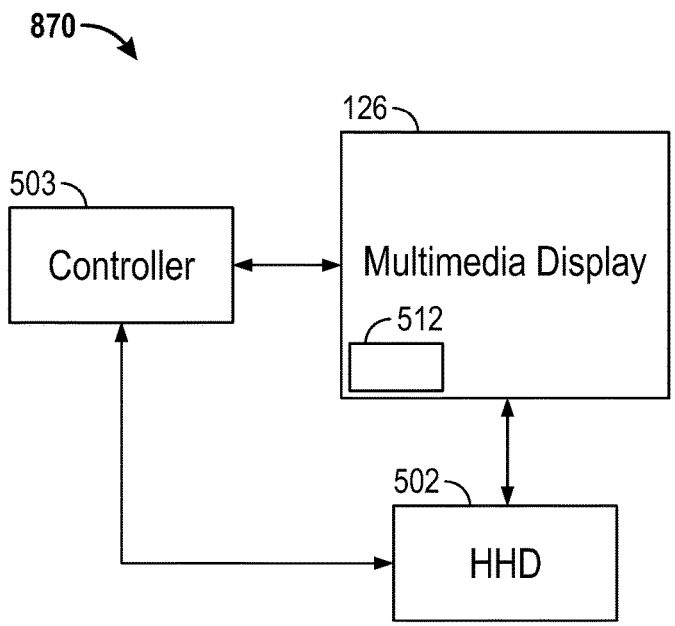
FIG. 15 illustrates a system generally including a multimedia display associated with a controller and which communicates with one or more wireless HHD's, in accordance with the disclosed embodiments.

FIG. 15 illustrates a system 870 generally including a multimedia display 126 associated with a controller and which communicates with one or more wireless HHD's, in accordance with the disclosed embodiments. The controller 503 can be integrated with the multimedia display 126 or may be a separate device, such as, for example, a set-top box that communicates with the multimedia display 126. Communications between the multimedia display 126 and the controller 503 may be wireless (e.g., bidirectional wireless communications) or wired (e.g., USB, HDMI, etc.). One or more HHD's such as, for example, wireless HHD 502 can communicate via wireless bidirectional communications with the controller 503 and/or the multimedia display 870 (e.g., in the case where the controller 503 is integrated with the multimedia display 126).

A user of the HHD 502 can utilize the HHD 502 to register the HHD 502 with the multimedia display 126. The HHD 502 is thus associated via this registration process with the multimedia display 126. Once registered and thus associated with that particular multimedia display 126 (and/or the controller 503), the user can utilize the HHD 502 to move an on-screen graphically displayed cursor to content/media of interest and then "click" the HHD 502 and select that area on the screen multimedia display 126, which then prompts a display of data supplemental to the selected content/media in a display of the HHD 502 itself and/or, for example, in a sub-screen 512 within the display 126. If within the display 126, the sub-screen would "pop up" and display the supplemental data within display 126. Alternatively, the supplemental data can be displayed for the user of the HHD 502 within a display area or display screen of the HHD 502.

Figure 16:
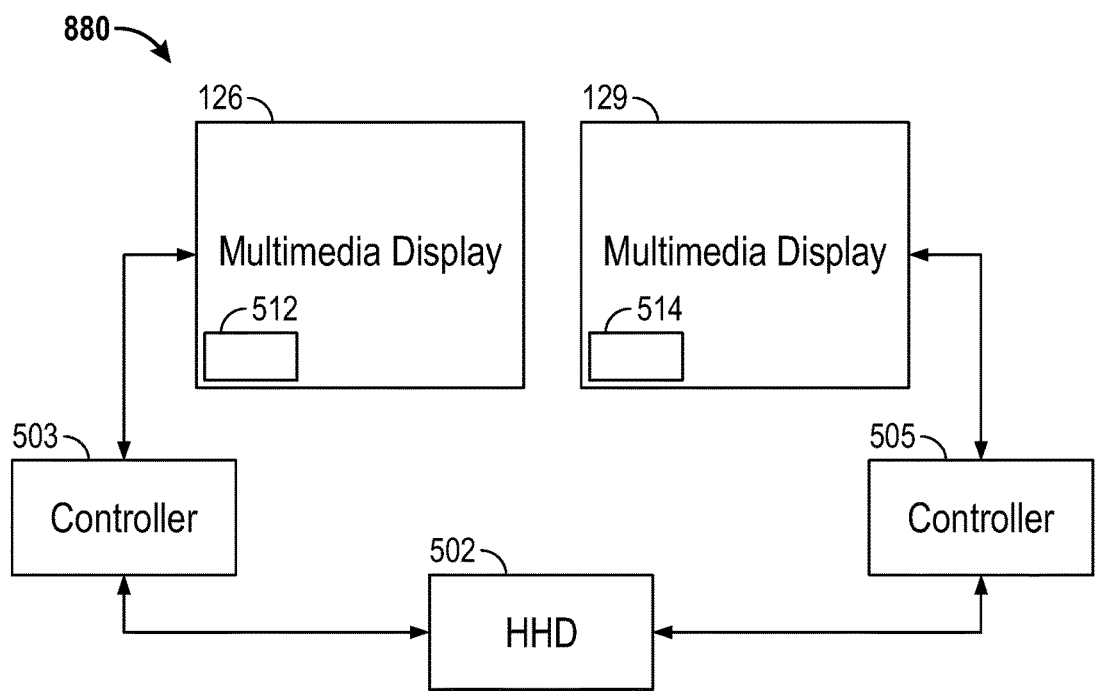
FIG. 16 illustrates a system that generally includes a multimedia display and a secondary multimedia display, in accordance with the disclosed embodiments.

FIG. 16 illustrates a system 880 that generally includes a multimedia display 126 and a secondary multimedia display 129, in accordance with the disclosed embodiments. As in FIG. 15, multimedia display 126 can be associated with a controller 503 and multimedia display 129 can be associated with controller 505. Controller 503 can communicate wirelessly or via wired means with multimedia display 126 and controller 505 can similarly communicate wirelessly or via wired means with multimedia display 129 (e.g., a secondary screen). The wireless HHD 502 can communicate via wireless bidirectional communications means with controller 503 and/or controller 505 and/or directly with multimedia displays 126 and/or 129. In the embodiment shown in FIG. 16, the supplemental data can be displayed via display 126, the HHD 502, and/or the secondary display 129. In some embodiments, the supplemental data can be displayed in a window or sub-screen 514 that "pop ups" in multimedia display 129. A similar display process for the supplemental data can occur via the window or sub-screen 512 that can "pop up" in multimedia display 126.

Figure 17:
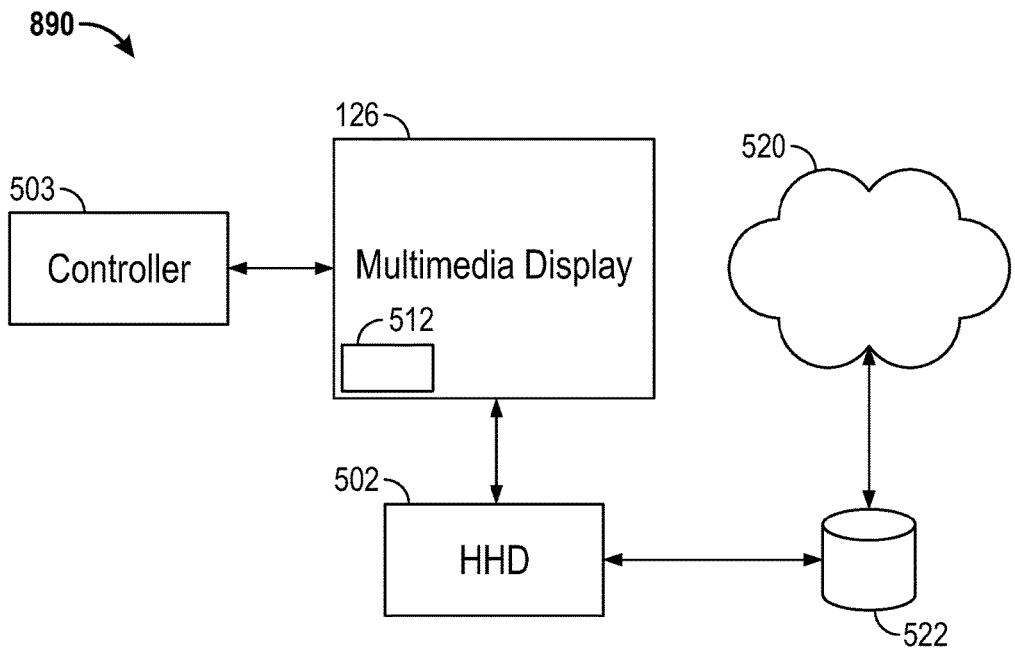
FIG. 17 illustrates a system in which a HHD can communicate wirelessly via a data network (e.g., the Internet) for storage of the supplemental data in a memory or database for later retrieval, in accordance with the disclosed embodiments.

FIG. 17 illustrates a system 890 in which HHD 502 can communicate wirelessly via a data network 520 (e.g., the Internet) for storage of the supplemental data in a memory or database 522 for later retrieval, in accordance with the disclosed embodiments. In some instances, a user of HHD 502 may wish to save the supplemental data in the "cloud" for later viewing, rather displaying the data immediately via a pop up window or sub-screen 512 of via a display associated with the HHD 502.

Figure 18:
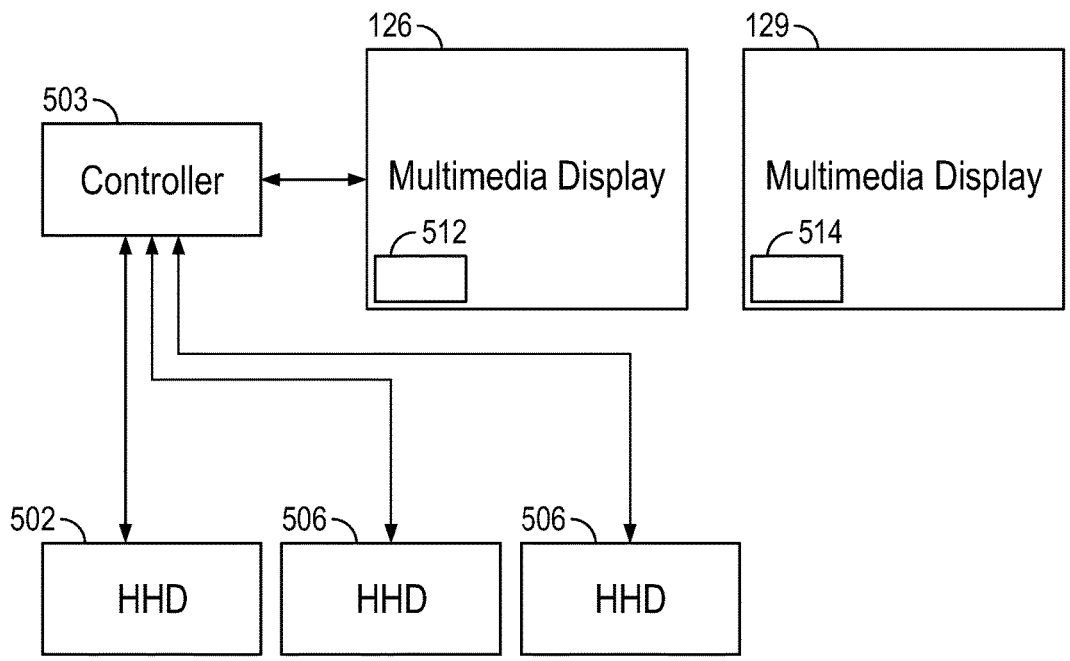
FIG. 18 illustrates a system in which multiple HHD's can communicate with the controller and/or the multimedia displays, in accordance with the disclosed embodiments.

FIG. 18 illustrates a system 900 in which multiple HHD's can communicate with the controller 503 and/or the multimedia displays 126 and/or 129, in accordance with the disclosed embodiments. Each HHD 502, 504, 506, etc., can be registered with the same controller 503 or with other controllers, such as controller 505 discussed previously. Similarly each controller HHD 502, 504, and/or 506, etc., can be registered with multimedia displays 126 and/or 129. All of the HHD's 502, 504, 506, etc., can interact with, for example, the main screen 126 and collaborate with one another (e.g., in a gaming environment). A user of HHD 504 may desire, for example, to display selected supplemental data on display 129 rather than display 126. A user of HHD 506 may desire to display the supplemental data only on his or her HHD. Each HHD 502, 504, 506, etc., can also independently interact with displayed media on either screen 126 or 129 to retrieve data of personal interest to that particular user of a respective HHD. In this sense, the "screen" via a controller such as controllers 503 and/or 505 can function as director of two or more HHD's, particularly in the context of a gaming environment.

Figure 19:
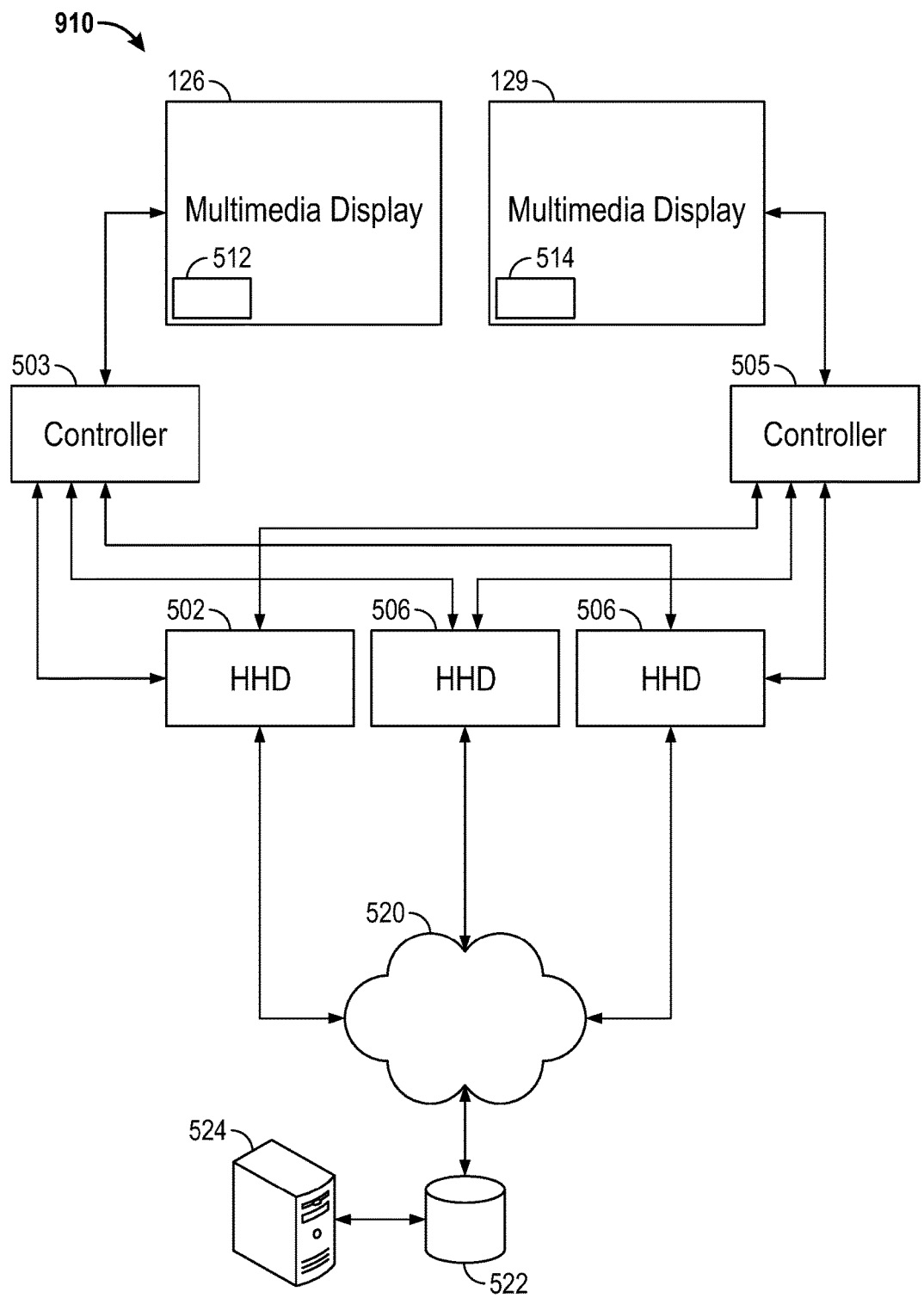
FIG. 19 illustrates a system in which multiple HHD's (or a single HHD in some cases) can communicate with a data network 520 that communicates with a server and database associated with and/or in communication with server, in accordance with the disclosed embodiments.

FIG. 19 illustrates a system 910 in which multiple HHD's (or a single HHD in some cases) can communicate with a data network 520 that communicates with a server 524 and database 522 associated with and/or in communication with sever 524, in accordance with the disclosed embodiments. Supplemental data can thus be stored via HHD 502, 504, and/or 506, etc., in database 522 or another appropriate memory for later retrieval. Thus data can be retrieved from remote servers such as server 524 via data network 520 (e.g., the Internet).

Figure 20:
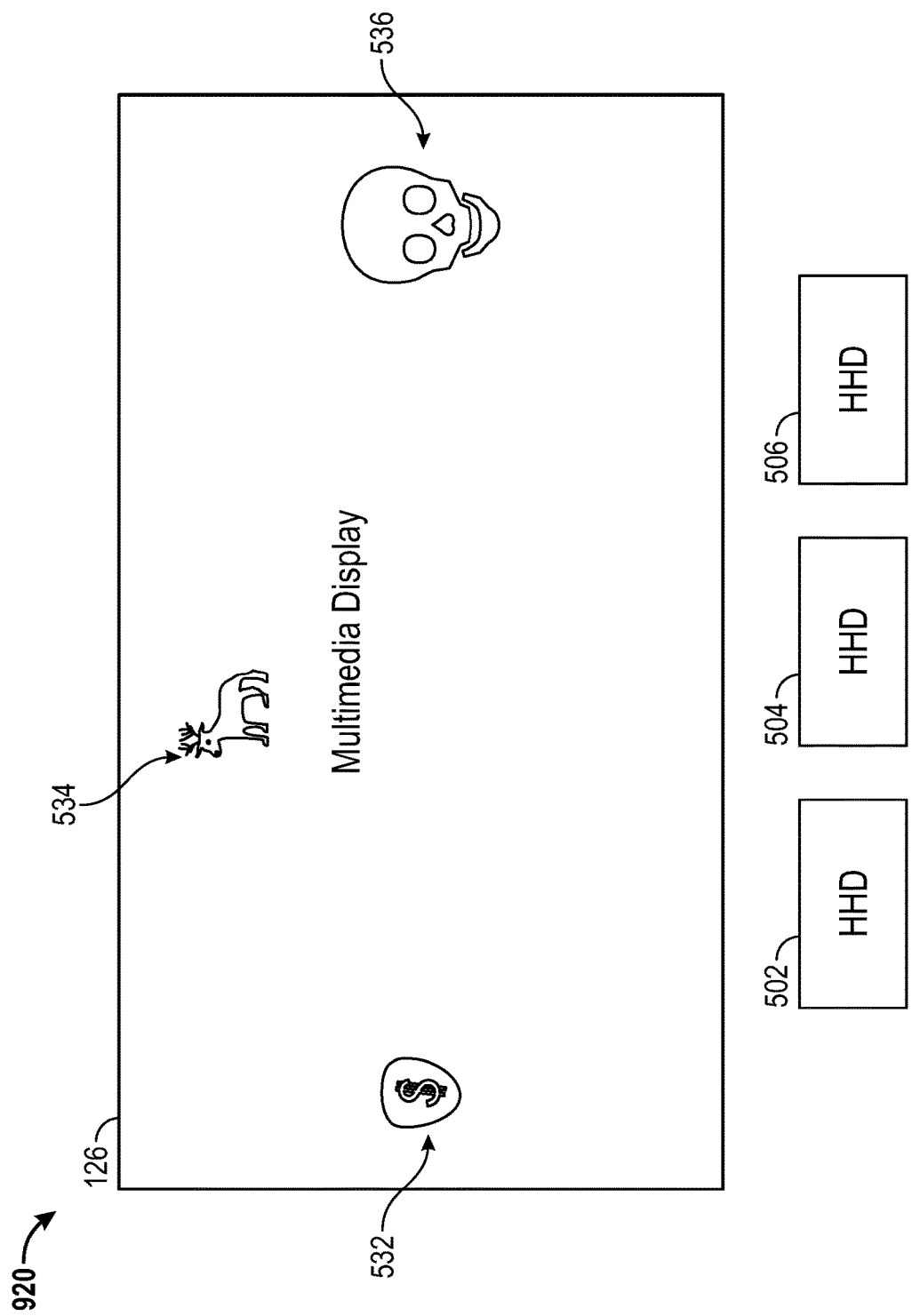
FIG. 20 illustrates a graphical view of a system that includes a multimedia display and one or more wireless HDD's etc., in accordance with the disclosed embodiments.

FIG. 20 illustrates a graphical view of a system 920 that includes a multimedia display 126 and one or more wireless HDD's 502, 504, 506, etc., in accordance with the disclosed embodiments. It can be assumed that the configuration shown in FIG. 20 can be implemented in the context of the other arrangements and systems disclosed herein (e.g., including various controllers, primary and secondary, screens, data networks, servers databases/memory components, and so forth). Each user of a HHD can designate his or her own personal profile icon during, for example, the registration process or at a later time. Each profile icon can be displayed as a cursor via a multimedia display such as multimedia display 126. Thus, for example, a user of HHD 502 may select a profile icon 532 in the form of a dollar sign, which is displayed graphically in display 126. Similarly, a user of HHD 504 may be, for example, a hunter or outdoorsman and may select a profile icon 534 in the symbol of a deer as his profile icon. A user of HHD 506 may, for example, select a profile icon 536 in the symbol of skeleton as his or her profile icon. It can be assumed that users may select primary and alternate profile icons so that in the case of two or more people with the same profile icon, a secondary profile icon may be displayed instead of a primary icon so as not to cause confusion among users of the various HHD's 502, 504, 506, etc., during the same session or event.

Figure 21:
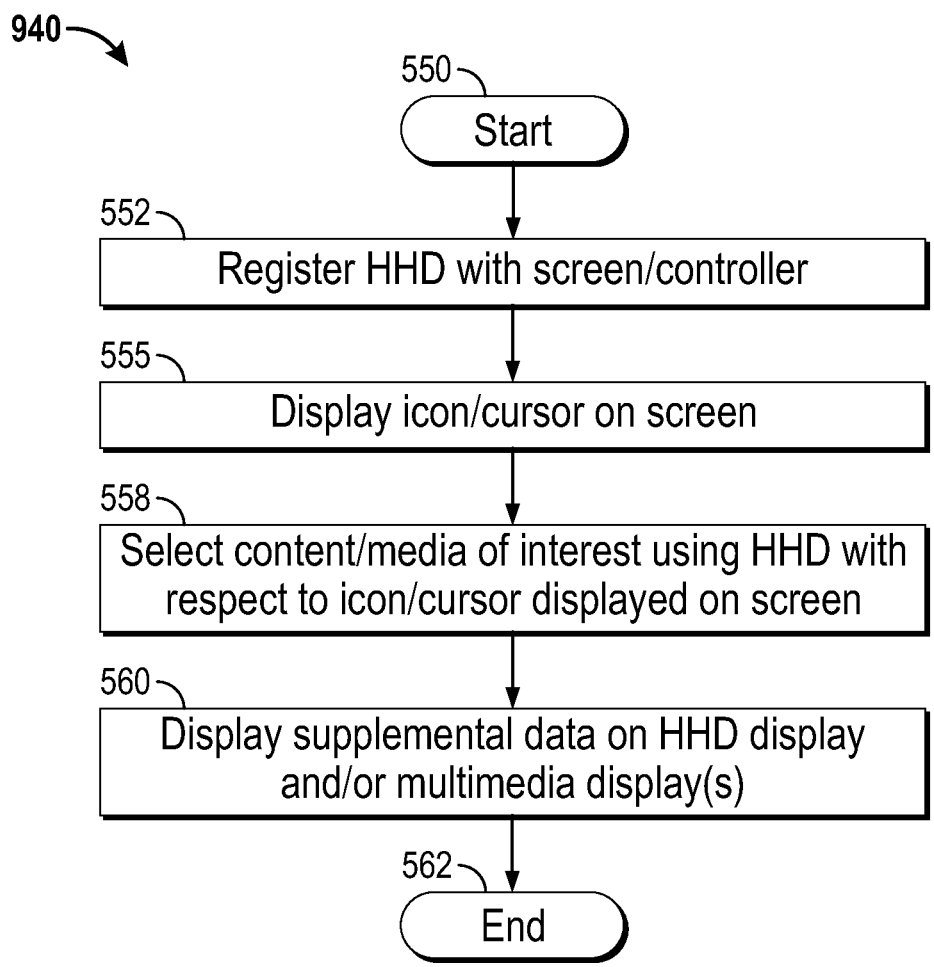
FIG. 21 illustrates a flow chart depicting logical operational steps of a method for registering and associating a HHD with a display screen and displaying supplemental data, in accordance with the disclosed embodiments.

FIG. 21 illustrates a flow chart depicting logical operational steps of a method 940 for registering and associating a HHD with a display screen and displaying supplemental data, in accordance with the disclosed embodiments. As indicated at block 550, the process can be initiated. Next, as shown at block 552, a HHD such as, for example, the HHD's 502, 504, 506, etc., can be registered with a multimedia display and/or a controller such as described previously. Thereafter, as illustrated at block 555, following registration and association with the display (e.g., via a controller), an icon or cursor can be displayed, which is associated with the HHD. Then, as depicted at block 558, the user of the HHD can select content/media of interest using the HHD with respect to the icon/cursor displayed on the multimedia display screen. Next, as shown at block 560, supplemental data can be displayed on the HHD display or on the multimedia display (or both). The process can then terminate, as shown at block 562.

Figure 22:
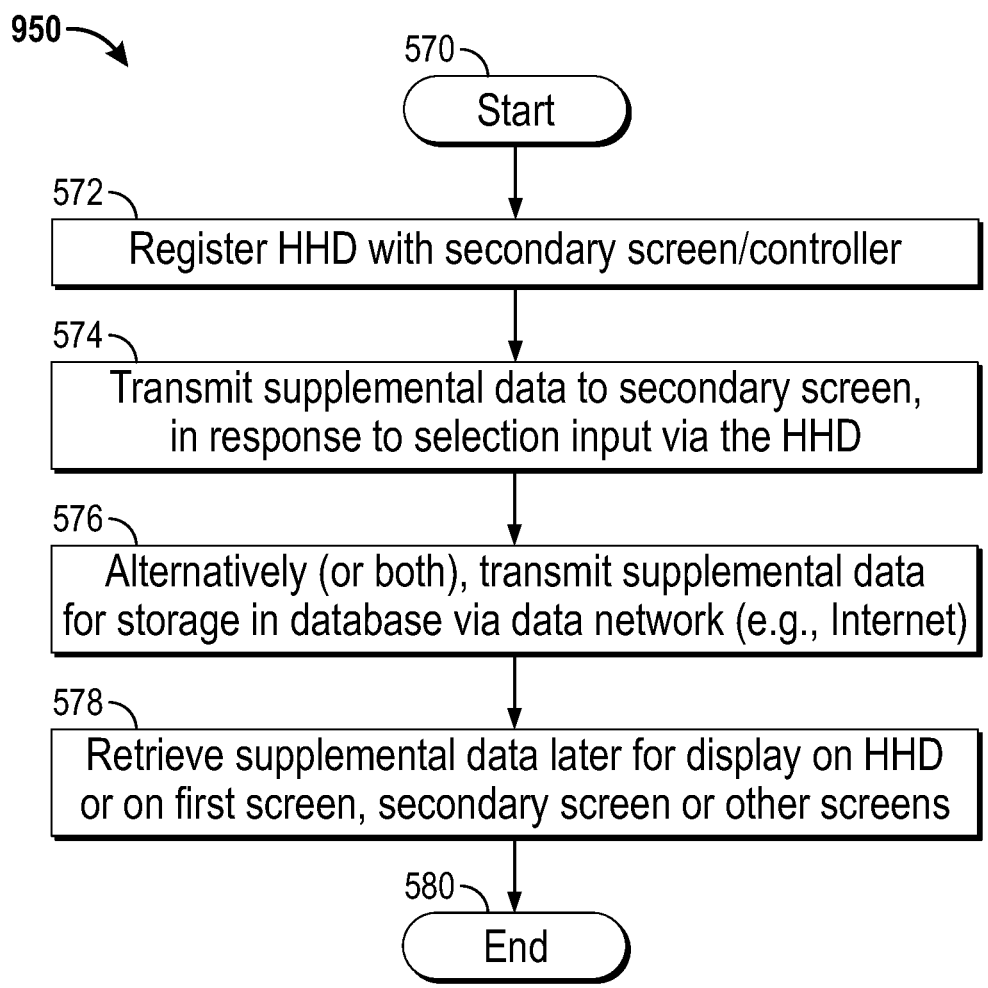
FIG. 22 illustrates a flow chart depicting logical operational steps of a method for transmitting, storing and retrieving supplemental data, and registering a HHD with a secondary screen, in accordance with the disclosed embodiments.

FIG. 22 illustrates a flow chart depicting logical operational steps of a method 950 for transmitting, storing and retrieving supplemental data, and registering a HHD with a secondary screen, in accordance with the disclosed embodiments. As indicate at block 570, the process begins. Then, as shown at block 572, the HHD can be registered with a secondary screen and/or associated controller. An example of a secondary screen is the multimedia display 129 discussed earner. Thereafter, in response to a particular user input via the HHD, as shown at block 574, supplemental data can be transmitted to a database (e.g., database/memory 522) via a data network, (e.g., network 520, the Internet, etc.), as illustrated at block 576. Then, as shown at block 578, the supplemental data can be retrieved for display via the secondary screen, the primary screen, and/or other screens, etc. The process can then terminate, as shown at block 580.

Figure 23:
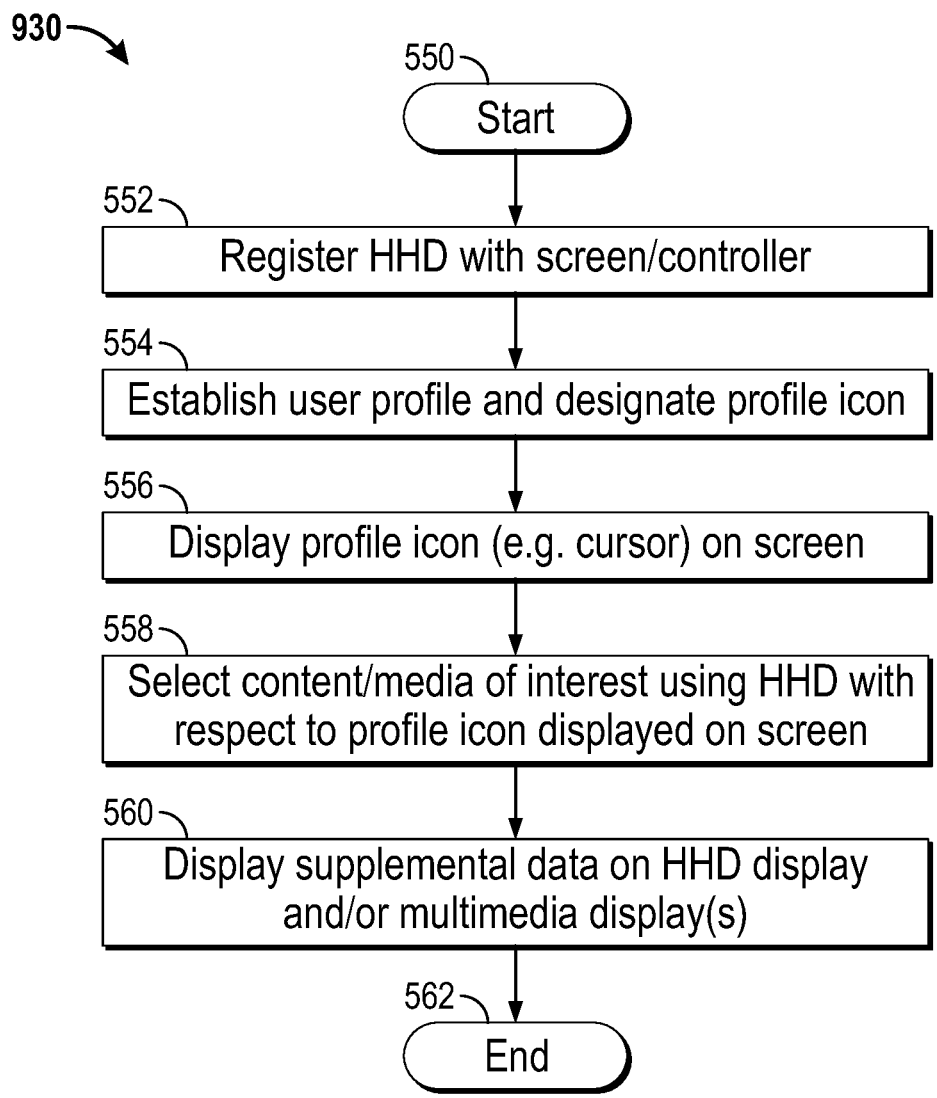
FIG. 23 illustrates a flow chart depicting logical operational steps of a method for designating and displaying profile icons for selection of content/media of interest and supplemental data thereof, in accordance with the disclosed embodiments.

FIG. 23 illustrates a flow chart depicting logical operational steps of a method 930 for designating and displaying profile icons for selection of content/media of interest and supplemental data thereof, in accordance with the disclosed embodiments. As shown at block 550, the process can be initiated. Next, as shown at block 552, the HHD (or multiple HHD's) can be registered (together or individually) with a multimedia display screen and/or associated controller. Thereafter, as shown at block 554, user profiles can be established via the HHD and one or more profile icons selected. Examples of profile icons include icons/cursors 532, 534, and 536 shown in FIG. 20. Next, as illustrated at block 556, one or more of the profile icons can be displayed "on-screen".

Thereafter, as shown at block 558, content/media of interest can be selected via the HHD with respect to the profile icon displayed on screen. For example, a profile icon/cursor may be moved via the HHD to an area of interest (e.g., an actor on screen). The user then "clicks" an appropriate HHD user control (or touch screen button in the case of a HHD touch screen) to initiate the display of supplemental data (with respect to the content/media of interest). The supplemental data can be displayed on, for example, a HHD display screen, as shown at block 560. The process can then end as depicted at block 562.

Based on the foregoing, it can be appreciated that a number of embodiments, disclosed and alternative, are disclosed herein. For example, in an embodiment, a method can be implemented for supporting bidirectional communications and data sharing. Such a method can include, for example, registering at least one wireless hand held device with a controller associated with at least one at least one multimedia display; selecting at least one profile icon for use as a cursor during interaction of the at least one wireless hand held device with the at least one multimedia display during rendering of an event as data on the at least one multimedia display; and providing supplemental data from at least one of the at least one multimedia display and/or a remote database to the at least one wireless hand held device based on a selection of the data rendered on the at least one multimedia display marked by the cursor utilizing the at least one wireless hand held device.

In other embodiments, a step can be implemented for providing the event as at least one of a movie, television program, recorded event, a live event, or a multimedia game. In yet other embodiments, a step can be implemented for manipulating via the controller, the data rendered on the at least one multimedia display utilizing the at least one wireless hand held device. In still other embodiments, a step can be implemented for storing the supplemental data in a memory in response to a user input via the at east one wireless hand held device. In other embodiments, a step can be implemented for pushing the supplemental data for rendering via at least one other multimedia display. In yet other embodiments, a step can be implemented for pushing the supplemental data via at least one of the at least one wireless hand held device, a remote server, or the controller associated with the at least one multimedia display. In still other embodiments, a step can be provided for filtering the supplemental data for rendering via a multimedia display. "Filtering" may include, for example, automatically sensing supplemental data based on a user profile or parameters for censoring or filing such data. For example, a public place such as a bar or restaurant may wish to prevent certain types of supplemental data (e.g., pornography, violence, etc.) from being displayed on multimedia displays in its establishment. Filtering may occur via the controller (set-top box), controls or settings on the displays themselves, and/or via the HHD accessing media of interest.

In another embodiment, a system can be implemented for supporting bidirectional communications and data sharing. Such a system can include a processor and a data bus coupled to the processor. In addition, such a system can include a computer-usable medium embodying computer code, the computer-usable medium being coupled to the data bus, the computer program code comprising instructions executable by the processor and configured for: registering at least one wireless hand held device with a controller associated with at least one multimedia display; selecting at least one profile icon for use as a cursor during interaction of the at least one wireless hand held device with the at least one multimedia display during rendering of an event as data on the at least one multimedia display; and providing supplemental data from at least one of the at least one multimedia display and/or a remote database to the at least one wireless hand held device based on a selection of the data rendered on the at least one multimedia display marked by the cursor utilizing the at least one wireless hand held device.

In another embodiment, such instructions can be further configured for providing the event as at least one of a movie, television program, recorded event, a live event, or a multimedia game. In yet another embodiment, such instructions can be further configured for manipulating via the controller, the data rendered on the at least one multimedia display utilizing the at least one wireless hand held device. In still other embodiments, such instructions can be further configured for storing the supplemental data in a memory in response to a user input via the at least one wireless hand held device. In yet another embodiment, such instructions can be configured for pushing the supplemental data for rendering via at least one other multimedia display. In other embodiments, such instructions can be further configured for pushing the supplemental data via at least one of the at least one wireless hand held device, a remote server, or the controller associated with the at least one multimedia display. In other embodiments, such instructions can be further configured for filtering the supplemental data for rendering via a multimedia display.

In another embodiment, a processor-readable medium can be implemented for storing code representing instructions to cause a processor to perform a process to support bidirectional communications and data sharing. Such code can in some embodiments, comprise code to register at least one wireless hand held device with a controller associated with at least one multimedia display; select at least one profile icon for use as a cursor during interaction of the at least one wireless hand held device with the at least one multimedia display during rendering of an event as data on the at least one multimedia display; and provide supplemental data from at least one of the at least one multimedia display and/or a remote database to the at least one wireless hand held device based on a selection of the data rendered on the at least one multimedia display marked by the cursor utilizing the at least one wireless hand held device.

In other embodiments, such code can further comprise code to provide the event as at least one of a movie, television program, recorded event, a live event, or a multimedia game. In still other embodiments, such code can comprise code to manipulate via the controller, the data rendered on the at least one multimedia display utilizing the at least one wireless hand held device. In yet other embodiments, such code can comprise code to store the supplemental data in a memory in response to a user input via the at least one wireless hand held device. In yet another embodiment, such code can comprise code to push the supplemental data for rendering via at least one other multimedia display. In still other embodiments, such code can comprise code to push the supplemental data via at least one of the at least one wireless hand held device, a remote server, or the controller associated with the at least one multimedia display. In other embodiments, such code can comprise code to filter the supplemental data for rendering via a multimedia display.

It will be appreciated that variations of the above-disclosed and other features and functions, or alternatives thereof, may be desirably combined into many other different systems or applications. Also, it can be appreciated that various presently unforeseen or unanticipated alternatives, modifications, variations or improvements therein may be subsequently made by those skilled in the art which are also intended to be encompassed by the following claims.

What is claimed is:

1. An augmented reality device for accessing a video annotation infrastructure, said augmented reality device comprising:
   a local display;
   a scene alignment module that locates a display position in said local display from at least one marker, wherein said display position is used to map points on said local display to points on a second display and wherein said at least one marker assists said augmented reality device in determining a location and a distance of said second display;
   an annotation data receiver that generates annotation selection data that is downloaded into said augmented reality device ahead of time or on-demand, wherein said annotation selection data includes cursor coordinates that yield an element identifier and annotation data that specifies at least one selectable zone comprising a combination of selectable areas and time periods during which said selectable areas are selectable and wherein said at least one selectable zone includes coordinates in both space and time;
   wherein said coordinates are specified as a series of discrete coordinates;

the augmented reality device further comprising:

a local data store and a query router, wherein said query router sends queries to at least one data server and said local data store within said augmented reality device, wherein said local display displays a cursor and query results with respect to said queries overlaid on top of a displayed image; and wherein said query results are gathered and passed for presentment to a user via said local display, wherein said local display shows said query results.

2. The augmented reality device of claim 1 wherein said annotation selection data comprises annotation data comprising data indicative of a cursor image.

3. The augmented reality device of claim 1 wherein said annotation selection data comprises annotation data comprising indicative of a template.

4. The augmented reality device of claim 1 wherein said annotation selection data comprises annotation data comprising data indicative of executable code data.

5. The augmented reality device of claim 1 further comprising a synchronization module that transmits synchronization data to an element identification module that provides said element identifier.

6. The augmented reality device of claim 5 wherein said annotation selection data comprises annotation data comprising data indicative of a cursor image.

7. The augmented reality device of claim 5 wherein said annotation selection data comprises data indicative of a template.

8. The augmented reality device of claim 5 wherein said annotation data comprises data indicative of executable code data.

9. The augmented reality device of claim 1 wherein said cursor coordinates include at least one cursor coordinate that combines an aim point and a media time stamp.

10. The augmented reality device of claim 1 wherein said coordinates are specified as a series of temporal extents and areal extents.

11. The augmented reality device of claim 1 wherein said coordinates are specified as a series of temporal extents and areal extents that change as a function of time when a selectable area moves on said local display, changes size during a scene displayed on said local display, or changes shape during said scene.

12. The augmented reality device of claim 10 wherein said areal extent comprises a bounding polygon.

13. The augmented reality device system of claim 10 wherein said areal extent comprises closed curves.

14. The augmented reality device of claim 11 wherein said scene comprises a scene of a multimedia event displayed in said local display and simultaneously on said second display wherein said multimedia event displayed on said local display and said second display is synchronized for display of said multimedia event via said local display and said second display.

15. The augmented reality device of claim 14 wherein said multimedia event comprises at least one of a movie, a live event, or a multimedia game.

16. The augmented reality device of claim 14 wherein said multimedia event is streamed as streamed video.

* * * * *